United States Patent
Durga et al.

(10) Patent No.: US 10,254,953 B2
(45) Date of Patent: Apr. 9, 2019

(54) TEXT INPUT METHOD USING CONTINUOUS TRACE ACROSS TWO OR MORE CLUSTERS OF CANDIDATE WORDS TO SELECT TWO OR MORE WORDS TO FORM A SEQUENCE, WHEREIN THE CANDIDATE WORDS ARE ARRANGED BASED ON SELECTION PROBABILITIES

(71) Applicant: Keypoint Technologies India Pvt. Ltd., Hyderabad (IN)

(72) Inventors: Naveen Durga, Secunderabad (IN); Prima Dona Kurian, Hyderabad (IN); Sandeep Yelubolu, Hyderabad (IN); Sumit Goswami, Hyderabad (IN); Sunil Motaparti, Hyderabad (IN)

(73) Assignee: Keypoint Technologies India Pvt. Ltd. (IN)

( * ) Notice: Subject to any disclaimer, the term of this patent is extended or adjusted under 35 U.S.C. 154(b) by 743 days.

(21) Appl. No.: 14/157,826

(22) Filed: Jan. 17, 2014

(65) Prior Publication Data
US 2014/0237356 A1    Aug. 21, 2014

(30) Foreign Application Priority Data

Jan. 21, 2013    (IN) .............................. 260/CHE/2013
Feb. 4, 2013    (IN) .............................. 469/CHE/2013

(51) Int. Cl.
*G06F 17/27* (2006.01)
*G06F 3/023* (2006.01)
(Continued)

(52) U.S. Cl.
CPC ........ *G06F 3/04883* (2013.01); *G06F 3/0233* (2013.01); *G06F 3/0236* (2013.01);
(Continued)

(58) Field of Classification Search
CPC .... G06F 17/21; G06F 3/04886; G06F 3/0233; G06F 3/0236; G06F 3/0237; G06F 17/276
(Continued)

(56) References Cited

U.S. PATENT DOCUMENTS

| | | | |
|---|---|---|---|
| 4,650,927 A | 3/1987 | James | |
| 5,128,672 A | 7/1992 | Kaehler | |

(Continued)

FOREIGN PATENT DOCUMENTS

| | | |
|---|---|---|
| CN | 1026630 C | 11/1994 |
| CN | 101122840 A | 2/2008 |

(Continued)

OTHER PUBLICATIONS

U.S. Patent and Trademark Office, International Searching Authority, International Search Report and Written Opinion for International Application No. PCT/IN/00039, dated Jul. 14, 2015, 12 pages.

(Continued)

*Primary Examiner* — Cesar B Paula
*Assistant Examiner* — Yahao Chen
(74) *Attorney, Agent, or Firm* — Brinks Gilson & Lione

(57) ABSTRACT

The present invention relates to a computer-implemented method for inputting text into an electronic device (10). The method includes selecting a first set of candidate words stored in a database. At least one of the first set of candidate words is then displayed on a screen (20) for selection by a user. The user generates a continuous input pattern (420; 540) and the method identifies one or more candidate words disposed along or proximal to the continuous input pattern (420; 540). The one or more identified candidate words are then input into a text entry field (430). The method includes refreshing the displayed candidate words when the continu- (Continued)

ous input pattern (420; 540) traces a predefined refresh gesture or enters/exits a predefined region (545). The present invention also relates to a computing device programmed to perform the method described herein.

26 Claims, 19 Drawing Sheets

(51) Int. Cl.
  *G06F 3/0484* (2013.01)
  *G06F 3/0488* (2013.01)
(52) U.S. Cl.
  CPC ........ *G06F 3/0237* (2013.01); *G06F 3/04842* (2013.01); *G06F 3/04886* (2013.01); *G06F 17/276* (2013.01)
(58) Field of Classification Search
  USPC .................................................. 715/256, 773
  See application file for complete search history.

(56) References Cited

U.S. PATENT DOCUMENTS

| | | | |
|---|---|---|---|
| 5,479,536 A | 12/1995 | Comerford | |
| 5,574,482 A | 11/1996 | Niemeier | |
| 5,621,641 A | 4/1997 | Freeman | |
| 5,625,354 A | 4/1997 | Lerman | |
| 5,649,223 A | 7/1997 | Freeman | |
| 5,687,254 A | 11/1997 | Poon | |
| 5,724,449 A | 3/1998 | Cornerford | |
| 5,748,512 A | 5/1998 | Vargas | |
| 5,911,485 A | 6/1999 | Rossmann | |
| 5,982,302 A | 11/1999 | Ure | |
| 5,999,895 A | 12/1999 | Forest | |
| 6,002,390 A * | 12/1999 | Masui | G06F 3/04886 340/4.1 |
| 6,002,862 A | 12/1999 | Takaike | |
| 6,005,549 A | 12/1999 | Forest | |
| 6,031,525 A | 2/2000 | Perlin | |
| 6,104,317 A | 8/2000 | Panagrossi | |
| 6,160,536 A | 12/2000 | Forest | |
| 6,286,064 B1 | 9/2001 | King et al. | |
| 6,292,179 B1 | 9/2001 | Lee | |
| 6,307,549 B1 | 10/2001 | King et al. | |
| 6,903,723 B1 | 6/2005 | Forest | |
| 7,098,896 B2 | 8/2006 | Kushler et al. | |
| 7,151,533 B2 | 12/2006 | Van Leperen | |
| 7,251,367 B2 | 7/2007 | Zhai | |
| 7,382,358 B2 | 6/2008 | Kushler et al. | |
| 7,453,439 B1 | 11/2008 | Kushler et al. | |
| 7,542,029 B2 | 6/2009 | Kushler | |
| 7,706,616 B2 | 4/2010 | Kristensson et al. | |
| 8,212,788 B2 | 7/2012 | Lam | |
| 8,266,528 B1* | 9/2012 | Hayes | G06F 3/0237 715/255 |
| 8,381,100 B1* | 2/2013 | Hayes | G06F 3/0237 715/255 |
| 8,669,941 B2 | 3/2014 | Sharan et al. | |
| 2002/0052900 A1 | 5/2002 | Freeman | |
| 2002/0060699 A1 | 5/2002 | D'Agostini | |
| 2002/0101441 A1 | 8/2002 | SanGiovanni | |
| 2002/0102025 A1 | 8/2002 | Wu | |
| 2002/0135561 A1 | 9/2002 | Rojewski | |
| 2002/0180797 A1 | 12/2002 | Bachmann | |
| 2003/0018714 A1 | 1/2003 | Mikhailov et al. | |
| 2004/0021691 A1 | 2/2004 | Dostie et al. | |
| 2004/0120583 A1 | 6/2004 | Zhai | |
| 2004/0140956 A1* | 7/2004 | Kushler | G06F 3/04883 345/168 |
| 2004/0163032 A1* | 8/2004 | Guo | G06F 3/0237 715/256 |
| 2005/0017954 A1 | 1/2005 | Kay et al. | |
| 2005/0190973 A1 | 9/2005 | Kristensson et al. | |
| 2005/0200609 A1 | 9/2005 | Van der Hoeven | |
| 2005/0231520 A1 | 10/2005 | Forest | |
| 2006/0176283 A1 | 8/2006 | Suraqui | |
| 2006/0265208 A1* | 11/2006 | Assadollahi | G06F 3/0237 704/9 |
| 2006/0265648 A1* | 11/2006 | Rainisto | G06F 3/0237 715/259 |
| 2007/0074131 A1* | 3/2007 | Assadollahi | G06F 3/0237 715/816 |
| 2007/0216651 A1 | 9/2007 | Patel | |
| 2008/0030463 A1 | 2/2008 | Forest | |
| 2008/0072143 A1* | 3/2008 | Assadollahi | G06F 3/0236 715/261 |
| 2008/0266263 A1 | 10/2008 | Motaparti et al. | |
| 2008/0310723 A1* | 12/2008 | Manu | G06F 3/0237 382/182 |
| 2009/0055732 A1 | 2/2009 | Motaparti et al. | |
| 2009/0174667 A1* | 7/2009 | Kocienda | G06F 3/0237 345/169 |
| 2009/0187846 A1* | 7/2009 | Paasovaara | G06F 3/0237 715/780 |
| 2009/0193334 A1* | 7/2009 | Assadollahi | G06F 17/276 715/261 |
| 2009/0306980 A1* | 12/2009 | Shin | G06F 1/1624 704/235 |
| 2010/0017872 A1 | 1/2010 | Goertz et al. | |
| 2010/0114930 A1 | 5/2010 | Kalasapur et al. | |
| 2010/0225599 A1* | 9/2010 | Danielsson | G06F 3/0237 345/173 |
| 2010/0302163 A1 | 12/2010 | Ghassabian | |
| 2011/0061017 A1* | 3/2011 | Ullrich | G06F 3/016 715/780 |
| 2011/0063231 A1 | 3/2011 | Jakobs | |
| 2011/0078563 A1 | 3/2011 | Archer | |
| 2011/0082686 A1 | 4/2011 | Suraqui | |
| 2011/0087961 A1* | 4/2011 | Fitusi | G06F 17/276 715/261 |
| 2011/0090151 A1 | 4/2011 | Huang et al. | |
| 2011/0119617 A1 | 5/2011 | Kristensson | |
| 2011/0122081 A1 | 5/2011 | Kushler | |
| 2011/0141027 A1 | 6/2011 | Ghassabian | |
| 2011/0193797 A1 | 8/2011 | Unruh | |
| 2011/0201387 A1* | 8/2011 | Paek | G06F 3/0237 455/566 |
| 2012/0036469 A1 | 2/2012 | Suraqui | |
| 2012/0192094 A1 | 7/2012 | Goertz | |
| 2012/0197825 A1* | 8/2012 | Medlock | G06N 3/084 706/11 |
| 2012/0235938 A1* | 9/2012 | Laubach | G06F 3/0416 345/173 |
| 2012/0303452 A1 | 11/2012 | Xue et al. | |
| 2013/0002556 A1* | 1/2013 | Griffin | G06F 3/0236 345/168 |
| 2013/0006639 A1 | 1/2013 | Kristensson et al. | |
| 2013/0018954 A1 | 1/2013 | Cheng | |
| 2013/0041857 A1* | 2/2013 | Medlock | G06F 17/276 706/14 |
| 2013/0046544 A1 | 2/2013 | Kay | |
| 2013/0120266 A1* | 5/2013 | Griffin | G06F 17/276 345/168 |
| 2013/0241838 A1* | 9/2013 | Onishi | G06F 3/0236 345/169 |
| 2013/0246329 A1* | 9/2013 | Pasquero | G06F 17/276 706/52 |
| 2013/0285916 A1* | 10/2013 | Griffin | G06F 3/0237 345/169 |
| 2013/0325438 A1* | 12/2013 | Griffin | G06F 17/273 704/9 |
| 2014/0002363 A1* | 1/2014 | Griffin | G06F 3/04886 345/168 |
| 2014/0013192 A1* | 1/2014 | McQuiggan | G09B 5/062 715/203 |
| 2014/0028603 A1 | 1/2014 | Xie et al. | |

(56) References Cited

U.S. PATENT DOCUMENTS

| | | | |
|---|---|---|---|
| 2014/0063067 A1* | 3/2014 | Compton | G06F 3/0237 345/660 |
| 2014/0163953 A1* | 6/2014 | Parikh | G06F 17/276 704/9 |
| 2015/0154175 A1* | 6/2015 | Sorensen | G06F 17/276 704/9 |

FOREIGN PATENT DOCUMENTS

| | | |
|---|---|---|
| CN | 101131619 A | 2/2008 |
| CN | 102360249 A | 2/2012 |
| CN | 102739873 | 10/2012 |
| EP | 213377 A1 | 3/1987 |
| EP | 0565872 A2 | 10/1993 |
| EP | 0651315 A1 | 5/1995 |
| EP | 0660218 A1 | 6/1995 |
| EP | 0732646 A2 | 9/1996 |
| EP | 0842463 A1 | 5/1998 |
| EP | 1010057 A1 | 6/2000 |
| EP | 1246048 A1 | 10/2002 |
| EP | 1724692 A2 | 11/2006 |
| EP | 2077486 A1 | 7/2009 |
| EP | 2336852 A2 | 6/2011 |
| GB | 233117 A | 5/1925 |
| GB | 233297 A | 6/1925 |
| GB | 231418 A | 8/1925 |
| GB | 233734 A | 7/1926 |
| IN | 260/CHE/2013 | 1/2013 |
| IN | 469/CHE/2013 | 2/2013 |
| JP | 7059170 | 3/1995 |
| JP | 2007-316732 | 12/2007 |
| JP | 2008-508600 | 3/2008 |
| JP | 2009-146435 | 7/2009 |
| JP | 2009-283015 | 12/2009 |
| JP | 2012-113741 | 6/2012 |
| JP | 2013-003801 | 1/2013 |
| WO | WO-1995/21436 A1 | 8/1995 |
| WO | WO-1996/30822 A1 | 10/1996 |
| WO | WO-97/05541 A1 | 2/1997 |
| WO | WO-1997/04580 A1 | 2/1997 |
| WO | WO-1997/30386 A1 | 8/1997 |
| WO | WO-98/33111 A1 | 7/1998 |
| WO | WO-1999/50818 A1 | 10/1999 |
| WO | WO-2000/35091 A1 | 6/2000 |
| WO | WO-2000/39663 A1 | 7/2000 |
| WO | WO-2000/57265 A1 | 9/2000 |
| WO | WO-2000/74240 A1 | 12/2000 |
| WO | WO-2001/11463 A2 | 2/2001 |
| WO | WO-2001/42871 A1 | 6/2001 |
| WO | WO-2001/59975 A2 | 8/2001 |
| WO | WO-2002/33527 A2 | 4/2002 |
| WO | WO-2002/37254 A1 | 5/2002 |
| WO | WO-2002/076075 A1 | 9/2002 |
| WO | WO-2002/095524 A2 | 11/2002 |
| WO | WO-2005/036310 A2 | 4/2005 |
| WO | WO-2005/093555 A2 | 10/2005 |
| WO | WO-2006/100505 A2 | 9/2006 |
| WO | WO-2006/100509 A2 | 9/2006 |
| WO | WO-2008/157021 A2 | 12/2008 |
| WO | WO-2009/005415 A1 | 1/2009 |
| WO | WO 2010/041092 A1 | 4/2010 |
| WO | WO-2010/047092 A1 | 4/2010 |
| WO | WO-2010/086689 A1 | 8/2010 |
| WO | WO-2010/112841 A1 | 10/2010 |
| WO | WO-2011/042710 A1 | 4/2011 |
| WO | WO-2011/107751 A2 | 9/2011 |
| WO | WO-2012/042217 A1 | 4/2012 |
| WO | WO-2012/139266 A1 | 10/2012 |

OTHER PUBLICATIONS

Arnott, J.L., et al. Probabilistic character disambiguation for reduced keyboards using small text samples, *Augmentative and Alternative Communication*, vol. 8, No. 3, pp. 215-223 (1992).

King, M.T., et al. Just-Type—Efficient communication with eight keys, in *Proc. RESNA '95 Annual Conference*, Vancouver, BC, Canada, pp. 94-96 (Jun. 9-14, 1995).

Kristensson, P., Design and evaluation of a shorthand aided soft keyboard, *Final/Master's Thesis (D-Uppsats)*, Linkoping University, Sweden. ISRN LiU-LOGVET-D-0—02/07—SE. Monograph; 96 pages (Aug. 28, 2002).

Kristensson, P., et al. Shark2: a large vocabulary shorthand writing system for pen-based computers, in *Proceedings of the 17th Annual ACM Symposium on User Interface Software and Technology (UIST 2004)*, ACM Press, pp. 43-52 (2004).

Long, A.C., et al. Implications for a gesture design tool, *CHI '99 Proceedings of the SIGCHI Conference on Human Factors in Computing Systems*, pp. 40-47 (1999).

Mankoff, J., et al. Cirrin: a word-level unistroker keyboard for pen input (1998).

Perlin, K. Quikwriting: continuous stylus-based text entry, *UIST '98 Proceedings of teh 11th Annual ACM Symposium on User Interface Software and Technology*, pp. 215-216 (1998).

Swiffin, A.L., et al. Adaptive and predictive techniques in communication prosthesis, *Adaptive and Alternative Communication*, vol. 3, No. 4, pp. 181-191 (1987).

Zhai, S., et al. Movement model, hits distribution and learning in virtual keyboarding, *CHI '02 Proceedings of the SIGCHI Conference on Human Factors in Computing Systems*, pp. 17-24 (2002).

Zhai, S., et al. The metropolis keyboard—an exploration of quantitative techniques for virtual keyboard design, *UIST '00 Proceedings of the 13th Annual ACM Symposium on User Interface Software and Technology*, pp. 119-128 (2000).

"Dynamic Time Warping", Jan. 17, 2013; retrieved from the internet: URL:https://en.wikipedia.org/w/index.php?title=Dynamic_time_warping&oldid=533575934 [retrieved on Sep. 19, 2016], 3 pages.

Supplemental European Search Report for corresponding European application No. EP 14741152.4 dated Sep. 30, 2016.

Extended European Search Report for corresponding European application No. EP 14763892.8 dated Sep. 29, 2016.

Translation of Japanese Office Action for application No. 2014-006905 dated Oct. 3, 2017.

EPO Office Action for Application No. 14 741 152.4-1216 dated May 2, 2018.

* cited by examiner

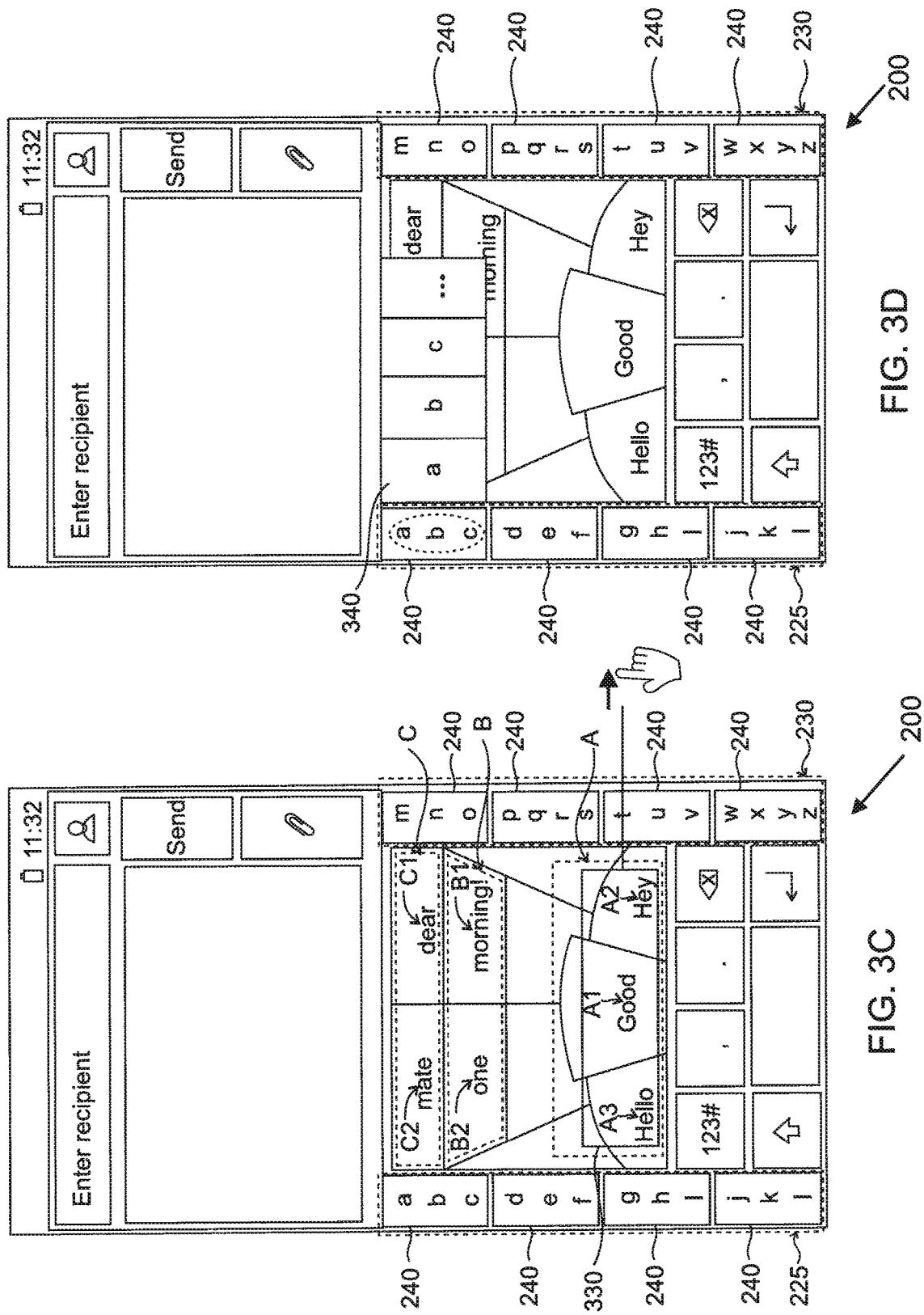

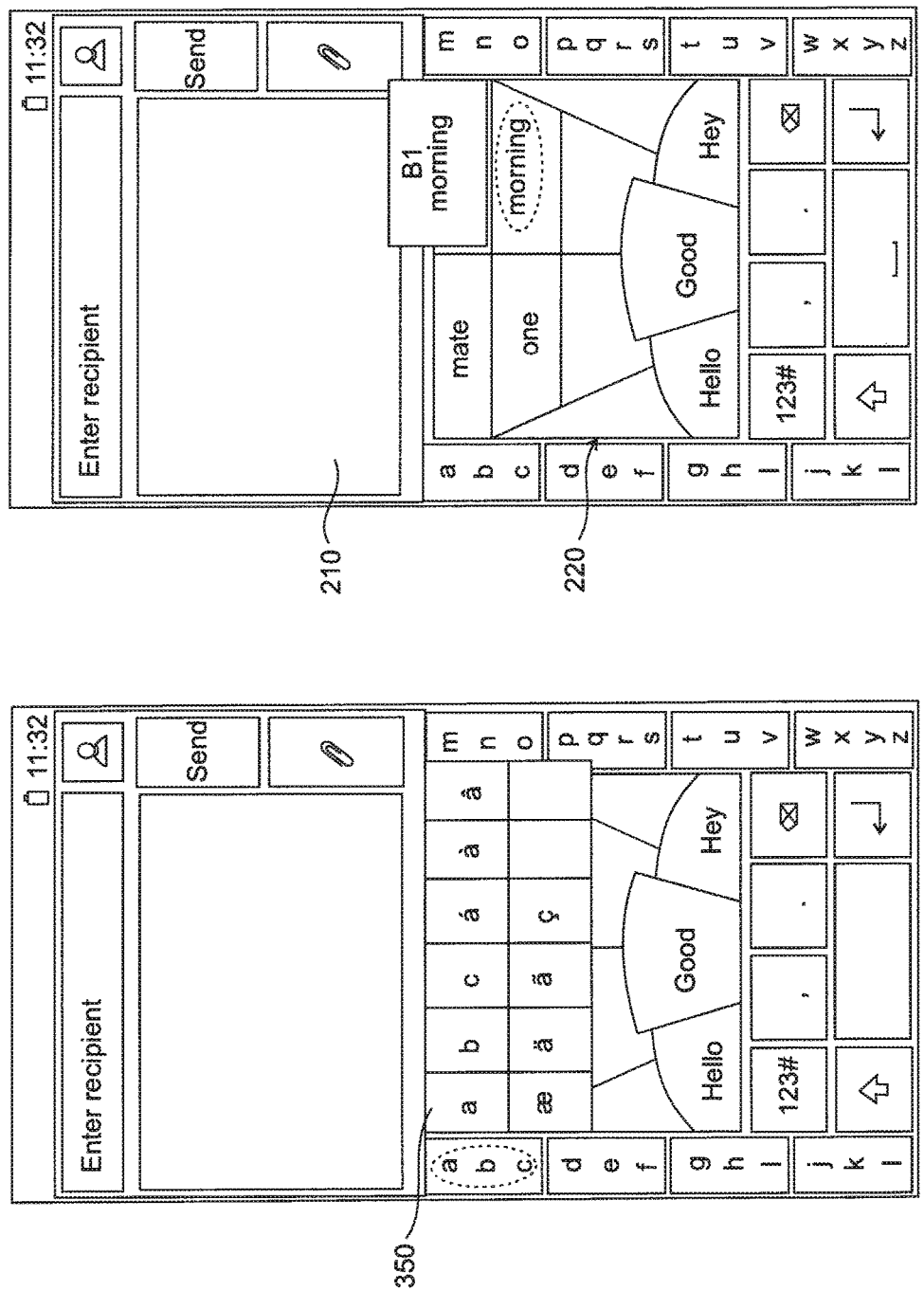

TEXT INPUT METHOD USING CONTINUOUS TRACE ACROSS TWO OR MORE CLUSTERS OF CANDIDATE WORDS TO SELECT TWO OR MORE WORDS TO FORM A SEQUENCE, WHEREIN THE CANDIDATE WORDS ARE ARRANGED BASED ON SELECTION PROBABILITIES

CROSS REFERENCE TO RELATED APPLICATIONS

The present application claims the benefit of Indian Patent Application No. 260/CHE/2013, filed in the Indian Patent Office on Jan. 21, 2013; and Indian Patent Application No. 469/CHE/2013, filed in the Indian Patent Office on Feb. 4, 2013, the entire contents of both applications are incorporated herein by reference.

TECHNICAL FIELD

The present invention relates to a computer-implemented method for inputting text into an electronic device; and a related computing device.

BACKGROUND OF THE INVENTION

It is known to implement predictive text systems on portable electronic devices, such as cellular telephones. The predictive text systems typically comprise an alphanumeric keyboard (either virtual or physical) for inputting at least part of a word. The predictive text system typically references a stored database and displays candidate words for selection by the user. The predictive text system can, for example, use frequency or probability information to determine the most likely word(s) for selection.

It is also known to predict complete words or sequences of words. For example, WO 2010/086689 discloses a mind map interface of an electronic device. A sequence of word chains radiate outwardly from a starting text, for example displayed on a touchscreen display. The user can select text by touching a corresponding spot on the display. Any intervening levels of additional text can be selected. However, this approach can restrict system flexibility and the user is restricted to the displayed options. Moreover, the user must review the display options each time text is entered.

An alternate word input mechanism is known from US 2009/0187846. A selection of candidate words is displayed along with an input keyboard. A user performs a touch event to select a particular word from the display. The user performs separate touch events to select different words to be input. The system thereby requires a staccato input technique which can prove disjointed for the user.

It is against this backdrop that the present invention has been composed. At least in certain embodiments, the present invention can overcome or ameliorate at least some of the shortcomings of the prior art systems.

SUMMARY OF THE INVENTION

Aspects of the present invention relate to a computer-implemented method for inputting text; and a computing device.

According to a further aspect of the present invention there is provided a computer-implemented method for inputting text into an electronic device, the method comprising:
 selecting a first set of candidate words from a database;
 displaying at least one of said first set of candidate words for selection by a user; and
 detecting a continuous input pattern generated by a user and identifying one or more candidate words disposed along or proximal to said continuous input pattern and inputting each identified candidate word into a text entry field;
 wherein the displayed candidate words are refreshed when said continuous input pattern corresponds to a predefined refresh gesture or said continuous input pattern enters/exits a predefined region. The input pattern can be traced by the user, for example by moving a cursor on a screen or by maintaining a contact with a touchscreen. By enabling the displayed candidate words to be refreshed automatically, the method allows the user to trace a continuous input pattern. At least in certain embodiments, the method can enable a user to input a sequence of words whilst tracing a continuous input pattern. Equally, at least in certain embodiments, the method can enable a user to input a phrase. The candidate words can, for example, be displayed in a sequence forming one or more phrases.

In an implementation utilising a cursor, the user can initiate the input pattern by pressing a button or key (for example a button on a computer mouse) and holding the button or key pressed while the input pattern is traced. The user can terminate the input pattern by releasing the button or key. In a touchscreen implementation, the user can make contact with the touchscreen to initiate the input pattern (typically by touching the touchscreen with a finger). The user can then trace the input pattern by maintaining contact with the touchscreen and moving relative to the touchscreen. The user can end the input pattern by terminating contact with the touchscreen (typically by lifting their finger off the touchscreen).

The refreshing of the displayed candidate words can comprise displaying additional words from said first set of candidate words and/or selecting a second set of candidate words from the database and displaying at least some of said second set of candidate words.

The method can comprise displaying a plurality of candidate words from said first set and/or said second set for selection by the user. The plurality of candidate words can be displayed in one or more word clusters. The positioning of the words within the one or more word clusters can be dependent on the likelihood of selection by the user. For example, the words within each word cluster can be displayed in different layers depending on the likelihood of selection by the user (for example, one or more foreground and/or background layers). The user can differentiate between the different words by moving between the various layers. The layers can, for example, be displayed in parallax scrolling to create a perception of depth. The method can comprise scrolling the different layers in dependence on a detected movement of an input device. For example, movements detected by an inertial sensor can be used to change the relative position of the different layers of candidate words displayed for selection on a screen. In the case of a cellular telephone, the user could, for example, tilt the cellular telephone to translate the layers relative to each other. The display could be a 3-D display, for example comprising parallax barriers, to provide enhanced depth perception of the words within each cluster.

The method can comprise grouping a set of candidate words into one or more groups of related candidate words. The related candidate words can be displayed in respective word clusters. For example, the candidate words can be based on topics, grammatical structure or rules.

The method can comprise selectively panning and/or zooming between and/or within said one or more of said clusters to facilitate selection of a candidate word. For example, the method can comprise zooming in and/or zooming out of one or more word clusters. The panning and/or zooming can be dependent on one or more of the following: an applied pressure on a touchscreen; a dwell time; a selection interval; detection of a predefined gesture; detection of a movement by a motion sensor.

The predefined refresh gesture can comprise a loop or a circular formed in the input pattern. The loop can be traced in a clockwise/anticlockwise direction. The loop can be traced in a clockwise direction to transition from right-to-left to left-to-right input; and the loop can be traced in an anticlockwise direction to transition from left-to-right to right-to-left input. This arrangement could be reversed. For example, the loop can be traced in a clockwise direction when the input text relates to a language which is read from left to right; and said one or more loops can be traced in an anticlockwise direction when the input text relates to a language which is read from right to left.

The method can comprise determining a major input direction of the input pattern. The major input direction corresponds to the predominant direction in which the input pattern is traced by the user. The major input direction can, for example, be determined by analysing movement vectors associated with the input pattern. The major input direction can be horizontal (from left to right or from right to left) or vertical (from top to bottom or from bottom to top). The major input direction can, for example, be based on the positioning of the candidate words displayed for selection by the user. The refresh gesture can comprise a change in the major input direction of the input pattern. For example, the refresh gesture can comprise a change in the major input direction from left-to-right to right-to-left (or vice versa). The change in the major input direction could, for example, occur at the edge of an input area or an edge of a display screen. Thus, the candidate words displayed for selection by the user can be refreshed automatically when the user changes the major input direction. The user may thereby continue to trace the input pattern without having to return to a start node or the like.

The displayed candidate words can be refreshed when the angular change in the major input direction exceeds a predefined threshold. For example, the angular threshold could be 45°, 90°, or 135°. Alternatively, the method can comprise determining when the major input direction is reversed (i.e. a change in direction substantially equivalent to 180°). In touch screen implementations, the reversal in the major input direction can be determined by detecting a multi-touch event and/or two or more consecutive contact points.

The predefined region can comprise an edge of an input area (for example, a word board). Upon determining that the input pattern has exited the input area or has reached a boundary of the input area, the method can comprise automatically refreshing the displayed candidate words. The input area can be defined as part or all of a display screen. A graphical element can be displayed on the display screen to indicate the boundary of the input area. Alternatively or in addition, upon determining that the input pattern has entered a predefined region (such as a refresh node), the method can comprise automatically refresh the displayed candidate words.

The one or more identified candidate words can be input sequentially into the text entry field as each word is identified in relation to the input pattern. Alternatively, the one or more identified candidate words can be input collectively into the text entry field, for example once tracing of the input pattern has been completed.

The method can also comprise displaying one or more of the following clusters: a symbol cluster; a numerical cluster; an alphanumeric cluster; an emoticon cluster; a character cluster; and a word cluster. The one or more clusters can be displayed proximal to the input pattern. For example, the one or more clusters can be displayed proximal to a current cursor location or a current contact event on a touchscreen. The one or more clusters can be predicted dynamically.

The one or more identified candidate words can be displayed in a lattice structure comprising one or more selection nodes corresponding to each candidate word. The lattice structure can comprise a root node and at least two, three or four child nodes arranged in one layer to display the next candidate word for selection. The lattice structure can comprise two or more layers, for example to display the next-next-word and so on. By way of example, the lattice structure can comprise two layers, each layer having one or more child nodes. The one or more child nodes in the first layer correspond to the next word; and the one or more child nodes in the second layer correspond to the next-next-word. There could be more than one root node. While the user traces from the root node into a child node to select it (say a candidate node), the child node(s) of that candidate node is/are refreshed. The other child nodes along with the root node can disappear. The new root node is the candidate node. The refresh may be initiated when the user traces out from say the current root node to a child node, where the distance traced out of the current root node is greater than some relevant threshold.

The lattice structure can, for example, have a diamond configuration comprising four outer selection nodes and a central selection node. A candidate word can be selected when the input pattern extends into the corresponding selection node. The displayed candidate words can be refreshed when the input pattern enters one of said selection nodes to select the candidate word associated with that selection node. When the input pattern enters one of the selection nodes, that selection node can become the root node. The selected candidate word is not refreshed, but some or all of the other selection nodes are refreshed. The refreshed candidates leading out of the new root node will be the next word predictions of the new root node. Adjacent nodes to the root node may represent current word predictions at the same level as the new root node.

Alternatively, the displayed candidate words can be refreshed when the input pattern crosses a threshold distance on a pathway to one of said selection nodes to select the candidate word associated with that selection node. The threshold distance could, for example, correspond to a halfway point between a current root node and one of said selection nodes. The root node typically corresponds to the most recently selected selection node and, therefore, can change dynamically as the input pattern is generated. The method can comprise displaying one or more candidate words predicted as following the most recently selected candidate word.

According to a further aspect of the present invention there is provided a computing device programmed to perform the method as described herein.

According to a still further aspect of the present invention there is provided a computing device comprising:

an input interface;
a display;
a processor configured, when operating a set of computer-readable instructions, to perform a word prediction process, the word prediction process comprising:
selecting a first set of candidate words from a database;
displaying at least one of said first set of candidate words for selection by a user; and
detecting a continuous input pattern generated by a user and identifying one or more candidate words disposed along or proximal to said continuous input pattern and inputting each identified candidate word into a text entry field;
wherein the displayed candidate words are refreshed when said continuous input pattern corresponds to a predefined gesture or enters/exits a predefined region.

According to a further aspect of the present invention there is provided a computer-implemented method for inputting text into an electronic device, the method comprising:
selecting a plurality of candidate words from a dictionary;
displaying at least some of said candidate words for selection by a user; and
detecting a continuous input pattern generated by a user;
wherein, as the input pattern is generated by the user, identifying one or more candidate words disposed along or proximal to said continuous input pattern and inputting said one or more identified candidate words into a text entry field. The identified candidate words can each be input into the text entry field in turn. By inputting the candidate words into the text entry field sequentially the user is able to determine their progress whilst navigating through a series of candidate words.

The input pattern can form an input gesture.

The dictionary can, for example, be a database. The candidate words can be selected based on one or more of the following: uni-frequency, probability information, grammatical rules (including syntax and/or semantics), and context. Suitable techniques for identifying and selecting candidate words are known from the Applicant's earlier applications WO 2005/093555, WO2006/100505, WO2006/100509, the contents of which are incorporated herein in their entirety by reference.

The dictionary can be stored on a suitable storage medium, such as solid state memory. The dictionary can be stored locally, for example on a cellular device, a tablet, a laptop, a desktop personal computer or other computational device. Alternatively, the dictionary can be stored remotely, for example on a server, and accessed over a network. The network could be a local area network (LAN), a wide area network (WAN) or the internet. A wired or wireless connection can be established with the dictionary. For example, the connection could be established over a telecommunication network, such as a wide area cellular telephone network, or a local wireless network, such as an IEEE 802.11 network. Equally, the computational steps associated with the method can be performed locally or on a remote server.

The entries in the dictionary can be linked, for example to identify relationships between words and/or a data structure hierarchy. The dictionary can comprise grammatical rules (for example based on syntax and/or semantics) and/or context to identify relationships between words. Equally, the dictionary can determine relationships between words based on historical usage by a user and/or analysis of reference texts. The relationship between entries in the dictionary could, for example, be determined based on probability and/or frequency data. The method can comprise selecting candidate words which are related to each other and outputting the related candidate words for display in one or more word clusters or groupings. The word clusters can each comprise a plurality of related candidate words for selection by the user. The user can cycle through the words in a particular word cluster to select the desired word to be entered into the text entry field. The cycling operation can be performed based on one or more of the following: dwell time; pressure; detection of a custom gesture; selecting a dedicated cycle node, for example defined in or proximal to the cluster; and so on. The candidate words in each word cluster can be spatially separate and can be visually distinguished from each other, for example by font size, type, colour format etc. The candidate words can be ordered and/or ranked of words within each word cluster and/or between word clusters.

The dictionary can comprise data derived from analysis of an existing corpus. Alternatively, or in addition, the dictionary can be updated dynamically to generate new data, for example with reference to a user's communication mediums (such as social accounts, emails, messaging applications), user-created content, user-preferred blogs, applications, browsers/search engines. This data can be applied online with or without a clear distinction of the source of learning. The dictionary can also utilise additional information, such as the beginning and/or end of editor/context/sentence/paragraph/message, or the type of underlying application.

The word clusters can be spatially separated from each other to reduce the chance of confusion. Alternatively, or in addition, the word clusters can be visually distinguished, for example by font size, type, colour, format, etc. Upon identification of a candidate word in a first of said word clusters, at least some of the candidate words displayed in a second of said word clusters can be updated or refreshed. The changes to the second word cluster can be to change word endings (for example to indicate the singular or plural; or to reflect a change in the tense of a verb); or to replace some or all of the candidate words for selection. The word cluster(s) can comprise one or more of the following: (a) a word; (b) a phrase; (c) a sentence.

The method can comprise displaying a symbol cluster to display symbols, such as punctuation marks, operators, signs and mathematical symbols. The symbol cluster could be a floating cluster which is, for example, displayed proximal to the input pattern. The method can comprise displaying a numerical or alphanumeric cluster. The method can include ranking the candidate symbols and displaying the candidate symbols within the symbol cluster based on their ranking. For example, the candidate symbols can be displayed within the symbol cluster in a ranked order.

The method can comprise displaying only some of the words required to construct a coherent sentence or phrase. The displayed words are referred to herein as key words and can be substantives, such as nouns and pronouns. The method can include automatically inserting intervening words between the key words (for example definite/indefinite articles and prepositions). The dictionary can include flags to indicate whether a candidate word is a key word or to otherwise categorize the word. The flags can qualify and/or quantify the candidate words; and optionally categorize the candidate words. The intervening words can, for example, be displayed in the text entry field prior to insertion once the candidate word is selected.

The method can comprise simultaneously displaying a plurality of candidate words for sequential selection by the user. At least one chain of candidate words can be displayed in a selection tree. The candidate words can each represent a node of the selection tree. By tracing the input pattern through part, or all of the selection tree, the user can select a sequence of words. The sequence of words can be displayed as one or more branches in said selection tree. A plurality of sequences can be displayed as different branches within the selection tree. The branches can be interlinked, having common nodes which are shared between several branches. The selected words are input into the text input field as they are selected. The method could include functions to allow a user to merge or split chains within the selection tree. For example, a user could drag and drop a selected word or a link between words to split/merge chains within the selection tree. Alternatively, or in addition, the user could perform a point contact, such as a tap, to select a chain to be merged or split. This would allow the user to refine the sequence of the candidate words prior to selection.

A refresh node can be displayed to enable the user to refresh the candidate words displayed. The refresh node could be selected independently, for example by a tap on a touchscreen display. The refresh node could be displayed at the end of the selection tree. The method can comprise refreshing the candidate words displaced in said at least one chain when the trace pattern enters the refresh node, for example after a sequence of candidate words has been selected from the selection tree.

The method can comprise measuring the speed at which a section of the input pattern is traced. The measured speed can be used to refresh the candidate words displayed for selection by the user. The method can comprise cycling through the displayed candidate words if the measured speed is below a predefined speed threshold; and/or displaying alternate candidate words if the measured speed is above said predefined speed threshold. The method could comprise measuring the speed in a defined region, for example corresponding to a base node for a word chain. Alternatively, or in addition, the displayed candidate words could be refreshed or replaced in response to other events, such as: detecting that the electronic device is being shaken; or recognising the input of a predefined gesture.

The method can comprise measuring an angular orientation of a section of the traced input pattern. The measurement could be performed relative to a predefined path between consecutive displayed candidate words, for example. The displayed candidate words could be adjusted based on the measured angular orientation. For example, the method could comprise cycling through the displayed candidate words if the measured angular orientation is below a predefined angular threshold; and/or displaying alternate candidate words if the measured angular orientation is above said predefined angular threshold.

One or more techniques can be employed to alternate candidate words and/or refine the candidate word attributes (such as tense, plural, gender etc.). By way of example, the techniques could include one or more of the following: an angular movement (gesture); a dedicated space within a cluster (e.g. a 'More' node); dwell time; detection of a circular gesture on the cluster to cycle alternate candidate words or refine word attributes. The alternate words can include inflections etc.; and additional words can include the next priority words.

The method could include detecting a contact pressure on a display. The contact pressure could, for example, be used to display alternate candidate words for selection (for example within a word cluster) or to provide alternate inflections for a selected candidate word. The contact pressure can be determined by identifying a pressure point on a touchscreen and determining the duration of the contact and/or area of the contact region on the touchscreen. A normalised value can be output to indicate the contact pressure. For example, a normalised value ranging from 0 to 1 can be output to indicate the contact area. A value of 0 indicates that there no pressure applied to the touchscreen; and a value of 1 indicates that there is pressure (the value can be greater than 1 in certain scenarios according to device calibrations). Similarly, an approximation of the contact area associated with a detected touch event can be output, for example as a normalised value ranging from 0 to 1 representing the pixel coverage. The graphical display can be modified in response to the detected contact pressure, for example to perform a zoom-in or size-enlargement function in dependence on a detected increase in the contact pressure; and/or a zoom-out or size-reduction function in dependence on a detected decrease in the contact pressure. A candidate word can be moved to the foreground and/or into the background within a word cluster in dependence on a detected contact pressure. If the user presses and the appearance contact with a word in the word cluster, the method can include drawing that word into the foreground.

The displayed candidate words each have a defined region associated therewith. The location of a touch event is monitored using XY coordinates to determine when the candidate word has been selected. The selection of a candidate word can be a combination of one or more of the following: coordinates, pressure, dwell time, position in the word boundary, previous selection point in the previous word cluster, context of words, unifrequency, topic, relation between words, etc.

The method described herein can facilitate the selection of a sequence of candidate words by tracing a continuous input pattern. The input pattern can be reset if one or more of the following events is detected: (a) the input pattern reaches an edge of a word board area; (b) the input pattern enters an editor space or a predefined space; and (c) the input pattern comprises a random movement. The method can optionally comprise removing any words inserted into the text input field associated with the rest input pattern.

The method can comprise displaying the input pattern on a screen. The method can also comprise displaying each identified candidate word along the displayed input pattern. The resulting trace pattern is thereby augmented with the identified candidate words. Additional candidate words can be displayed, for example in a word cluster or a selection window, to allow the user to continue the sequence.

If the input pattern remains over a displayed candidate word for a predetermined time period, inflections are displayed for the displayed candidate word. For example, alternate word endings can be displayed for selection by the user. The inflections can also be displayed and/or selected using a multi-touch technique. For example, the input pattern could be traced with a first contact and a selection could be made with a second contact.

The method can comprise arranging several candidate words in a group for selection by the user as a single entity. The words can, for example, be arranged to form a phrase or the like. The group of candidate words can be input into the text entry field together.

In a still further aspect of the present invention there is provided a computing device comprising:
    an input interface;
    a display;
    a processor configured, when operating a set of computer-readable instructions, to perform a word prediction process, the word prediction process comprising:

determining a plurality of candidate words;
displaying at least some of said candidate words on said display for selection by a user; and
detecting a continuous input pattern via said input interface;
wherein, during detection of the input pattern, identifying one or more candidate words disposed along or proximal to said continuous input pattern and inputting each identified candidate word into a text entry field in turn. The computing device can be configured to perform the method described herein.

According to a yet still further aspect of the present invention there is provided a computer-implemented method for inputting text into an electronic device, the method comprising:
selecting a plurality of candidate words from a database;
identifying related candidate words; and
displaying said related candidate words in proximity to each other. The one or more sets of related words can be displayed in one or more word clusters.

According to a still further aspect of the present invention there is provided a computer-implemented method for inputting text into an electronic device, the method comprising:
selecting a plurality of candidate words from a database; and
displaying at least some of said candidate words for selection by a user;
wherein the candidate words displayed for selection by the user consist of key words and the method comprises automatically inserting intervening words between key words selected by the user.

In a further aspect of the present invention there is provided a machine-readable storage medium having machine-executable instructions encoded thereon that upon execution by a processor direct a computer to perform the method(s) described herein.

In a still further aspect of the present invention there is provided a computing device programmed to perform the method(s) as described herein. The computing device can comprise one or more electronic micro-processors operable to perform the method(s) described herein, for example by executing a stored instruction set. The instruction set can, for example, be provided in hardware (for example stored in non-volatile memory or encoded on said one or more electronic micro-processors) or can be provided as software (for example on a machine-readable medium or downloaded over a network onto volatile memory). The method(s) described herein could be performed locally on the computing device; or could be performed remotely over a network, such as a cellular communications network or the Internet (for example over a Wi-Fi™ connection).

The method(s) described herein have particular application on devices comprising a touchscreen, such as a cellular telephone, a laptop or a tablet computer. The input pattern is typically traced by the user making contact with the touchscreen, for example with their finger or a stylus. The touchscreen can, for example, be provided on a desktop monitor, a laptop, a tablet computer or a cellular telephone. The present invention is not limited to touchscreen devices and the method(s) could be implemented on other computational devices, such as a laptop, a desktop computing device (such as a personal computer) or a video gaming console. The input pattern can be traced using a variety/combination of input devices, such as a computer mouse, a computer keyboard, a joystick, a D-pad, a touchpad, a roller ball, cursor keys, pressure sensing devices, eye-tracking, remote controls, remote tracking (for example using a camera), projection keyboards, camera sensors and wearable sensors to detect in-air gestures from the user, hard keyboard devices and so on. Other related technologies like accelerometer may be used to select the word in the word cluster, trace into the next cluster, select the next possible word etc and generate continuous phrases, sentences.

A further aspect of the present invention relates to a computer-implemented method for inputting text into an electronic device, the method comprising:
identifying a first set of candidate words in a database;
displaying said first set of candidate words on a display for selection by a user;
detecting an input pattern traced by a user and selecting one or more of said candidate words for input into said electronic device based on said input pattern;
wherein the candidate words in said first set are displayed in a first word cluster, the candidate words being arranged within the first word cluster in dependence on a statistical indicator of the likelihood of each candidate word being selected by the user. The candidate words can be arranged within the word cluster to facilitate identification of the words with reference to the corner points. For example, the candidate words can be arranged within the first word cluster to promote the formation of corner points.

The method can comprise identifying one or more significant points in said input pattern traced by the user. The one or more candidate words can be selected with reference to said one or more significant points. The one or more significant points can comprise one or more of the following: a significant start point (for example the start point of the input pattern); a significant endpoint (for example the end of the input pattern); a significant intermediate point; a corner point; a change in direction; a change in curvature. Additional parameters, such as dwell time and contact pressure, can also be used to select said candidate word(s).

A selection node can be associated with each displayed candidate word. The selection node can be a defined region on said display corresponding to the position of said candidate word. The candidate word can be identified by mapping the identified significant point(s) to said selection node(s). For example, the proximity of a significant point to one or more of the displayed candidate words can be used to select a candidate word for input. The significant points can be identified as the input pattern is traced. This technique allows the candidate words to be identified while the input pattern is being traced by the user.

The statistical indicator could comprise historic data, for example the frequency of use (unifrequency data) of each candidate word. Alternatively, or in addition, the statistical indicator can comprise selection probability data. The selection probability can be predefined or can be calculated. The selection probability could be a combined probability to provide an indication of the likelihood of two or more words being selected, for example to form a sequence. The selection probability data can incorporate additional data, for example context data and indices.

The candidate words for display in said first word cluster can be ranked in dependence on said statistical indicator. The candidate words can be ranked in descending order of the likelihood of selection. Thus, the candidate word most likely to be selected can be the highest ranked candidate word. The method can comprise displaying the candidate words based on their relative rankings. The closely ranked candidate words can be spaced apart from each other when displayed in said first word cluster. The candidate words can, for example, be deemed to be closely ranked if they are within one or two ranked positions of each other. The consecutively ranked candidate words can, for example, be displayed on opposite sides of said first word cluster. More particularly, consecutively ranked candidate words can be displayed at least substantially diametrically opposite each other within said first word cluster.

The first word cluster can have a first virtual centre (i.e. a centre point of the word cluster). The candidate words within said first word cluster are each displayed a discrete distance from said first virtual centre. (The distance for each candidate word can, for example, be measured from a centre point of a selection node associated with that candidate word.) The candidate words can each be displayed a distance from said first virtual centre which is related to said statistical indicator. The distance from each candidate word to said first virtual centre can, for example, be proportional to the statistical indicator of the likelihood of that candidate word being selected. The distance between the first virtual centre and each candidate word can be directly proportional to the statistical indicator. Thus, the greater the likelihood of the candidate word being selected, the greater the distance of that candidate word from said first virtual centre on the display. This technique displays the candidate words most likely to be selected apart from the other candidate words, thereby making them easier to be identified by the user and helping to avoid the input pattern being traced over several candidate words within the first word cluster. Alternatively, the distance between the first virtual centre and each candidate word can be inversely proportional to the statistical indicator.

The method can comprise identifying a second set of candidate words in the database. The candidate words can be displayed in said second set are displayed in a second word cluster. The candidate words in said second set can be selected for input after one or more of the candidate words from the first set. The candidate words making up the second set can be identified for input sequentially after the candidate word from said first set.

The candidate words in said second set can be arranged within the second word cluster in dependence on a statistical indicator of the likelihood of each candidate word being selected by the user. The statistical indicator can be a selection probability calculated for each said candidate word. The statistical indicator could comprise frequency of use data. The statistical indicator can comprise a calculated selection probability.

A combined selection probability can be calculated to determine the likelihood of a candidate word from said second set being selected after a candidate word from said first set. The combined selection probability can thereby provide an indication of the likelihood of a sequential pair of candidate words being selected. The candidate words can be displayed in said first set and/or said second set based on the calculated combined selection probability.

The method can comprise identifying one or more pairs of candidate words in said first and second sets having a relatively high combined selection probability. The method can comprise displaying said one or more pairs of candidate words proximal to each other in said first and second word clusters. Alternatively, or in addition, the method can comprise displaying said one or more pairs of candidate words within said first and second word clusters such that a linear pathway can be traced between the candidate words making up said word pair without traversing other candidate words. The candidate words can be deemed to have a relatively high combined selection probability if the combined probability exceeds a predefined threshold.

The candidate words displayed in said first word cluster and/or said second word cluster can be rotated about a centre point to position said candidate words proximal to each other. The rotation can be performed to achieve the desired relative orientation of the candidate words in the first and second word clusters. The method can comprise ranking one or more pairs of candidate words based on the combined probability and displaying the candidate words in said first and second clusters such that the distance between the candidate words is smaller for those word pairs having a higher ranking.

The first and second word clusters can be displayed simultaneously such that the input pattern can be traced continuously through the displayed candidate words to select one or more candidate words from each of said first and second word clusters. The first and second word clusters can be offset horizontally and vertically from each other on said display.

A third word cluster can be displayed simultaneously with said first and second word clusters. The third word cluster can be vertically and/or horizontally offset from said second word cluster. Additional word clusters, for example four or five word clusters can be displayed simultaneously. It will be appreciated that the techniques described herein can be applied to enable n clusters (where n is a whole number) to be displayed simultaneously. The word clusters can each be vertically and horizontally offset from the preceding word cluster in a sequence.

The candidate words described herein can be combined with alphanumeric characters. The alphanumeric characters can comprise or consist of numbers and/or punctuation marks. The alphanumeric characters can be displayed along with the candidate words for selection by the user. The alphanumeric characters could be displayed in a separate alphanumeric character cluster. The alphanumeric characters within said alphanumeric character cluster could be arranged based on a statistical indicator of the selection likelihood. The statistical indicator could, for example, comprise probability data to indicate the likelihood of the punctuation mark being associated with one or more preceding words, for example a candidate word (or words) already selected by the user. The display of the alphanumeric characters within an alphanumeric character cluster is believed to be patentable independently.

According to a still further aspect of the present invention there is provided a computer-implemented method for inputting text into an electronic device, the method comprising:
identifying a set of alphanumeric characters;
displaying said set of alphanumeric characters on a display for selection by a user;
detecting an input pattern traced by a user and selecting one or more of said alphanumeric characters for input into said electronic device based on said input pattern;
wherein the alphanumeric characters in said first set are displayed in an alphanumeric character cluster, the alphanumeric characters being arranged within the alphanumeric character cluster in dependence on a statistical indicator of the likelihood of each alphanumeric characters being selected by the user. The statistical indicator can, for example, comprise probability data. One or more grammatical rules can also be utilised to determine the location of said alphanumeric characters within said alphanumeric character cluster.

The alphanumeric character cluster could be displayed in sequence with a word cluster of the type described herein. The alphanumeric character cluster could be displayed before or after said word clusters. The techniques described herein for arranging the display of candidate words within a word cluster can also be applied to the display of the alphanumeric characters within the alphanumeric character cluster. Similarly, the positioning of the alphanumeric character cluster in relation to a word cluster can be based on the techniques described herein for the relative positioning of word clusters.

According to a yet further aspect of the present invention there is provided a computer-implemented method for inputting text into an electronic device, the method comprising:
  identifying a first set of candidate words and displaying said first set of candidate words in a first word cluster; and
  identifying a second set of candidate words and displaying said second set of candidate words in a second word cluster;
  wherein said first and second word clusters are offset from each other vertically and horizontally.

The method can comprise identifying a third set of candidate words and displaying said third set of candidate words in a third word cluster. The third word cluster can be vertically and/or horizontally offset from said second word cluster. Additional word clusters can also be displayed.

According to still further aspect of the present invention, there is provided a computer-implemented method for inputting text into an electronic device, the method comprising:
  identifying a sequence of candidate words in a database;
  displaying said at least one sequence of candidate words on a display;
  detecting an input pattern traced by a user and selecting one or more of said candidate words for input into said electronic device based on said input pattern;
  wherein consecutive candidate words in said sequence are horizontally and vertically offset from each other on said display, wherein the horizontal and/or vertical offset between said consecutive candidate words is based on a statistical indicator of the likelihood of the consecutive candidate words being selected.

An input pattern traced through said sequence of candidate can define at least one corner point associated with one of said candidate words. The sequence can comprise two or more candidate words which may, for example, be displayed with a selection node to confirm a selection. Alternatively, the sequence can comprise three or more candidate words.

The sequence of candidate words can be identified based on a combined selection probability.

The horizontal offset and/or the vertical offset can be directly or inversely proportional to the likelihood of the consecutive words being selected.

The method can include identifying one or more corner point in said input pattern. The selection of said one or more candidate words from said sequence can be based on proximity to said one or more corner points.

References herein to horizontal and vertical are in relation to horizontal and vertical axes of the display. These axes can change depending on whether the display is in a portrait or landscape configuration.

Furthermore, the present invention has been described with reference to candidate words. It will be appreciated that the invention could also be applied for candidate phrases, for example comprising two or more words. The phrases could be stored in the database or could be compiled dynamically. Moreover, the present invention could be applied to numerical values and/or alphanumeric characters.

The contents of the applicant's co-pending Indian patent application number 260/CHE/2013 filed on 21 Jan. 2013 are incorporated herein in their entirety by reference.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 3C illustrates a third view of a first user interface for the word prediction system operating on the cellular telephone illustrated in FIG. 1;

FIG. 3D illustrates a fourth view of a first user interface for the word prediction system operating on the cellular telephone illustrated in FIG. 1;

FIG. 3E illustrates a fifth view of a first user interface for the word prediction system operating on the cellular telephone illustrated in FIG. 1;

FIG. 3F illustrates a sixth view of a first user interface for the word prediction system operating on the cellular telephone illustrated in FIG. 1;

DETAILED DESCRIPTION OF AN EMBODIMENT

A cellular telephone 10 having a word prediction function in accordance with an embodiment of the present invention will now be described with reference to the accompanying Figures. In the present embodiment, the cellular telephone 10 comprises a touchscreen display 20 for displaying system information and receiving user inputs. The word prediction function is used to input text in various applications operating on the cellular telephone 10, for example to compose part or all of a Short Messaging Service (SMS) text message, an email or a document.

Figure 1:
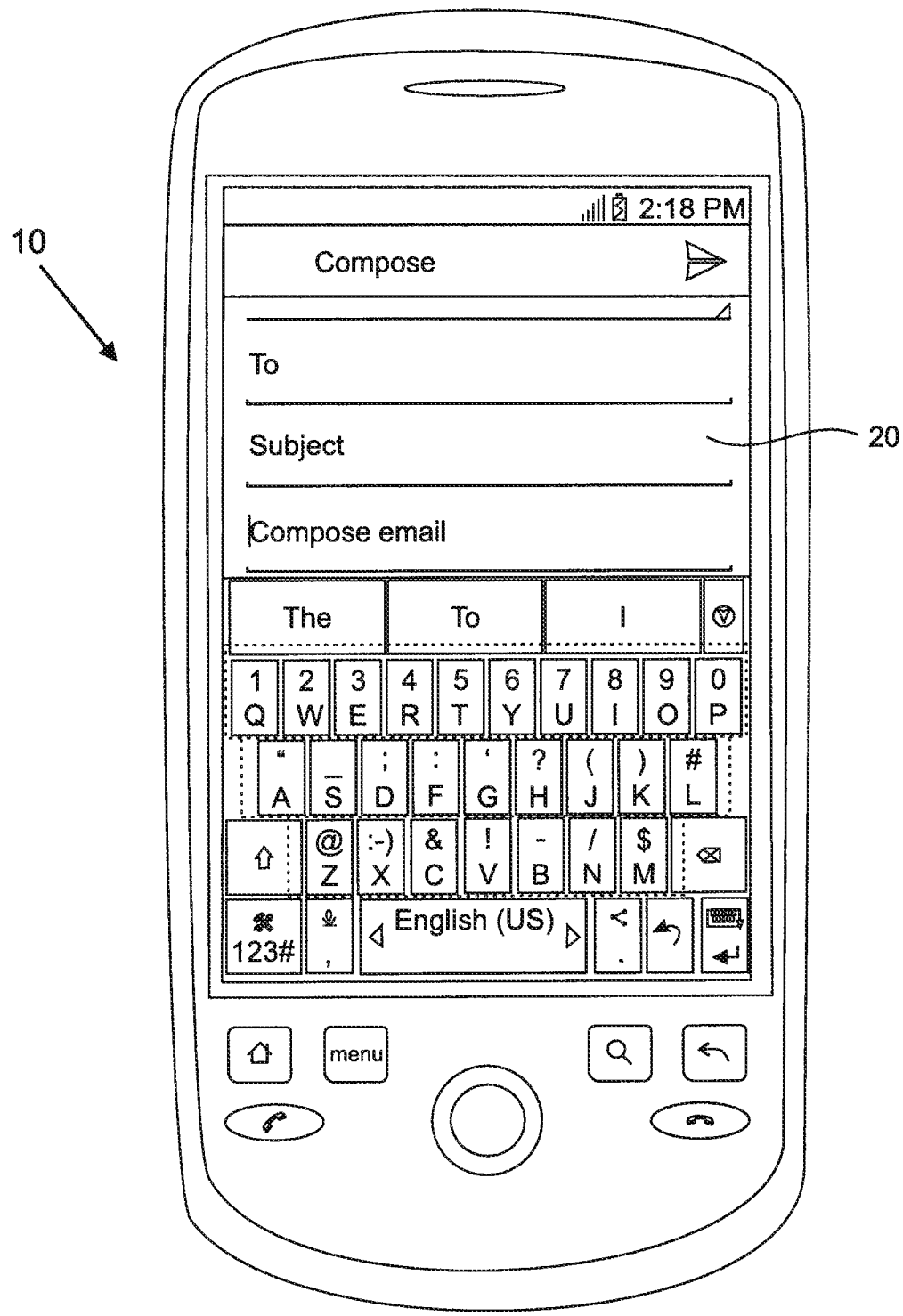
FIG. 1 shows a cellular telephone for operating a word prediction system in accordance with an embodiment of the present invention.
Figure 2:
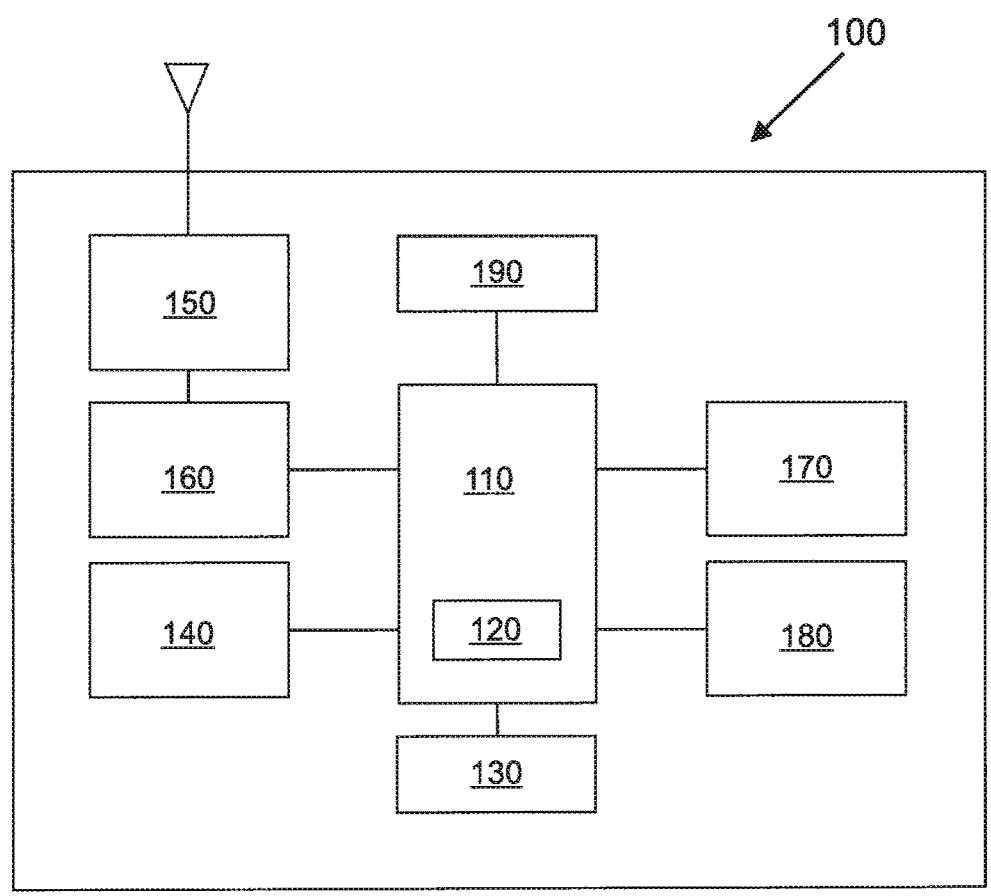
FIG. 2 is a schematic block diagram of the cellular telephone shown in FIG. 1.

A schematic block diagram 100 of the cellular telephone 10 is shown in FIG. 2. The cellular telephone 10 comprises a central processing unit 110 operating a word prediction system 120 in accordance with an embodiment of the present invention. The central processing unit 110 is coupled to an on-board memory 130 and an input/output interface 140 associated with the touchscreen display 20. The cellular telephone 10 also comprises a radio circuit 150 and a signal processing circuit 160 for wireless communication over a cellular network. A microphone 170 and a speaker 180 are provided for the respective input and output of sound signals. A local wireless transceiver 190 can also be provided to establish communication over a WiFi™ network or the like.

The touchscreen display 20 can provide multi-touch sensing to enable more than one contact point on the screen to be detected at any time. The touchscreen display 20 can, for example, comprise a capacitive touchscreen. The user inputs on the touchscreen display 20 can consist of a point contact (for example when a user taps the screen) or a continuous input pattern in the form of a gesture (for example when a user traces a continuous path across the screen).

The word prediction system 120 according to the present embodiment is configured to facilitate the input of complete words by the user. The word prediction system 120 has particular application in enabling the sequential input of a string of words by tracing a continuous input pattern on the touchscreen display 20. The word prediction system 120 can be embedded on the central processing unit 110 (for example in Read Only Memory) or can operate as a software application providing a set of computational instructions to control operation of the central processing unit 110. The word prediction system 120 in the present embodiment takes the form of a set of instructions operative to control the processing unit 110 to implement a method of predicting words to be input onto the cellular telephone 10 (or any other computational device).

The word prediction system 120 identifies candidate words for selection by the user, for example based on one or more of the following: unifrequency, context of use, beginning of editor, and beginning of context. A user may input one or more letters, for example using a virtual keyboard displayed on the touchscreen display 20, to guide the word prediction system 120.

The word prediction system 120 can identify a first set of words for selection by the user. Where there is no context available, the word prediction system 120 can identify said first set based on one or more of the following:

1. Top most uni-frequency words in the dictionary.
2. Based on the corpus, top most uni-frequency words occurring as the first word in the corpus.
3. Learning from user's style—Based on the previous text typed by the user, update the counts. User's style can be learnt from other sources such as social networking sites, other information in the device or any information explicitly provided by the user for learning the style.
4. Based on the syntactic categories—which syntactic categories of words can occur at the beginning.
5. Based on the application (for example in an email application the first word would be "hi").
6. Topic modelling: If the topic of conversation could be identified (from previous input sentences), the suggestions could be tailored to the conversation topic.
7. Based on semantics and significant co-occurrences (for example from the previous input sentences).

The word prediction system 120 can use context to identify subsequent word(s) based on one or more of the following:

1. Based on uni-frequency counts.
2. Based on context—the previous words typed in—using n-gram language models.
3. Syntax information may also be used to select syntactically relevant words.
4. Semantics.
5. Significant co-occurrences of words.
6. Topic based modelling.
7. Classification approach.

Figure 3A:
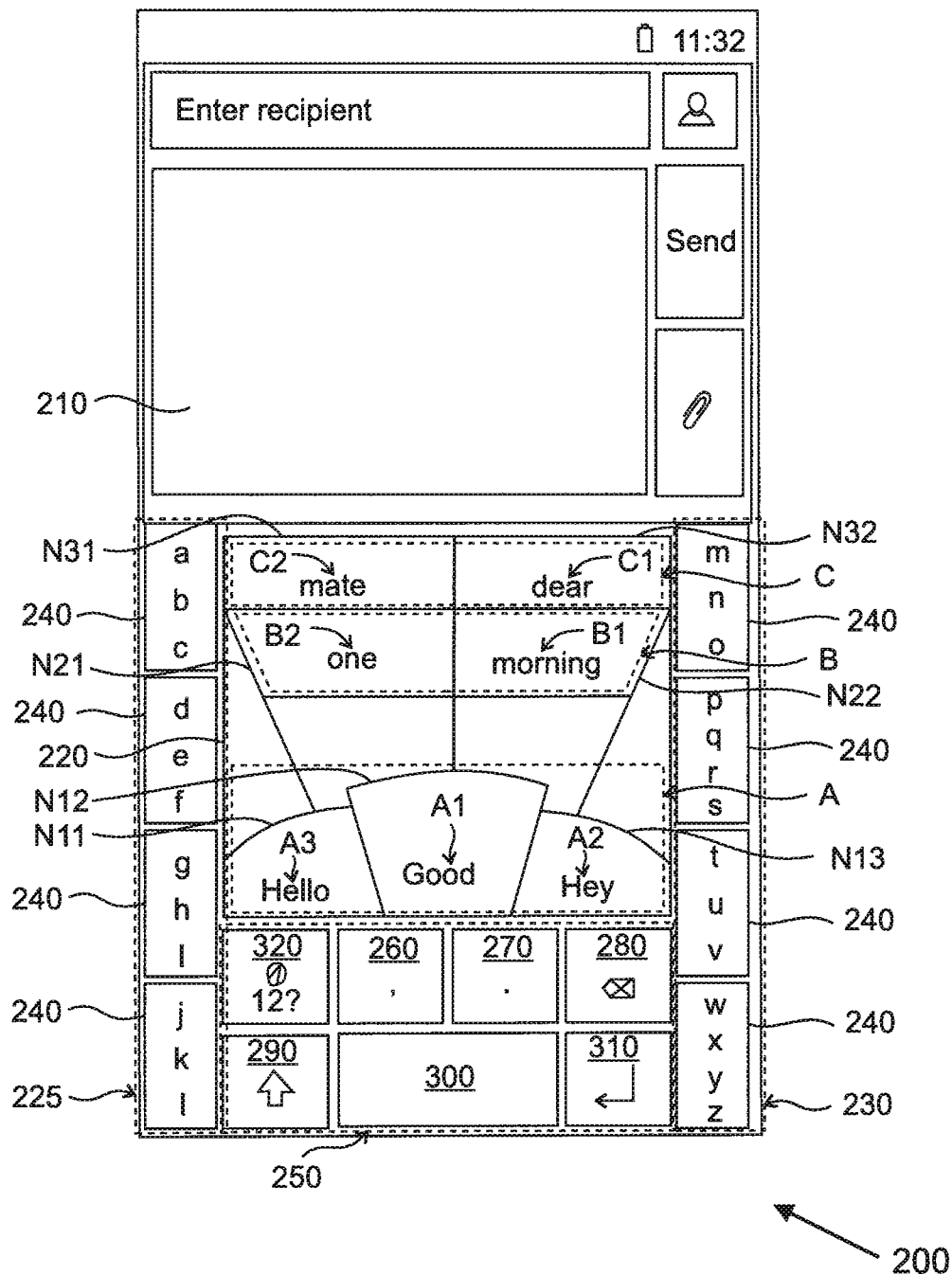
FIG. 3A illustrates a first view of a first user interface for the word prediction system operating on the cellular telephone illustrated in FIG. 1.

A first graphical user interface (GUI) 200 for the word prediction system 120 will now be described with reference to FIGS. 3A-G. As described herein, the first GUI 200 can be displayed in either portrait or landscape mode providing similar functionality, but will be described herein primarily with reference to the portrait mode. As shown in FIG. 3A, the first GUI 200 comprises a text input field 210 and a word board 220 in which candidate words are displayed for selection. Once selected in the word board 220, the word is input inline into the text input field 210.

The word board 220 is bounded laterally by first and second columns 225, 230 each comprising four side keys 240 arranged to form a truncated alphanumeric keyboard. The side keys 240 each represent a set of alphabetical letters of the alphabet (abc; def, ghi . . . tuv; wxyz) and appropriate indicia are displayed on the side keys 240. A bottom bar 250 is displayed below the word board 220 to provide additional input functions. First and second punctuation keys 260, 270 are provided to input a period (or 'full stop') and a comma respectively. A delete key 280 is provided to allow letters, words and sentences to be deleted from the text input field 210. A shift key 290, a space bar key 300 and a carriage return key 310 are also provided for formatting text in the text input field 210. The functions of these keys are consistent with the keys on a full size keyboard. A numerical input key 320 is provided to allow a user to select a numerical keyboard to input numbers and/or special symbols.

The word board 220 in the first GUI 200 is divided into first, second and third tiers A, B, C collectively representing a sequence of candidate words for selection by the user. The first tier A comprises a first sub-set of candidate words which are likely to be the first word selected by the user in the current sequence. The second tier B comprises a second sub-set made up of the candidate words which are likely to be the second word selected by the user in the current sequence (i.e. to succeed the first input word). The third tier C comprises a third sub-set of candidate words which are likely to be the third word selected by the user in the current sequence (i.e. to succeed the second input word).

In the present embodiment, the first sub-set comprises three candidate words (A1, A2, A3), the second sub-set comprises two candidate words (B1, B2); and the third sub-set comprises two words (C1, C2). The word board 220 is configured to display each candidate word in a selection node which can optionally be partially or completely framed to represent a virtual key. The candidate word can be selected by tracing the input pattern IP into or through the selection node associated with that candidate word. The first sub-set of candidate words is arranged such that the most likely word for selection by the user is positioned centrally and displayed in a larger font size to facilitate selection. The candidate words in the second and third sub-sets are arranged to form sequential chains for selection by the user. Thus, the candidate words most likely to follow each other are arranged adjacent to each other in the consecutive tiers A, B, C. A series of candidate word chains are thereby displayed to enable a user, at least in certain embodiments, to select a sequence of candidate words for input into the text input field 210.

With reference to the exemplary arrangement shown in FIG. 3A, the first sub-set consists of the candidate words "Good" (A1), "Hey" (A2) and "Hello" (A3) displayed in the primary nodes (N11), (N12), (N13). The candidate word "Good" (A1) has been identified as the most likely word to be selected by the user and is, therefore, displayed in the primary node (N12) having a central position. The other candidate words, "Hey" (A2) and "Hello" (A3), in the first sub-set are displayed in lateral nodes (N12), (N13). The second sub-set consists of the candidate words "morning" (B1) and "one" (B2) displayed in secondary nodes (N11), (N12). The third sub-set consists of the candidate words "dear" (C1) and "mate" (C2) displayed in tertiary nodes (N31), (N32). The candidate words in the second and third sub-sets are arranged to form the alternate word chains "Good morning dear" corresponding to a first chain of nodes (N12, N22, N32); and "Good one mate" corresponding to a second chain of nodes (N12, N21, N31).

Figure 3B:
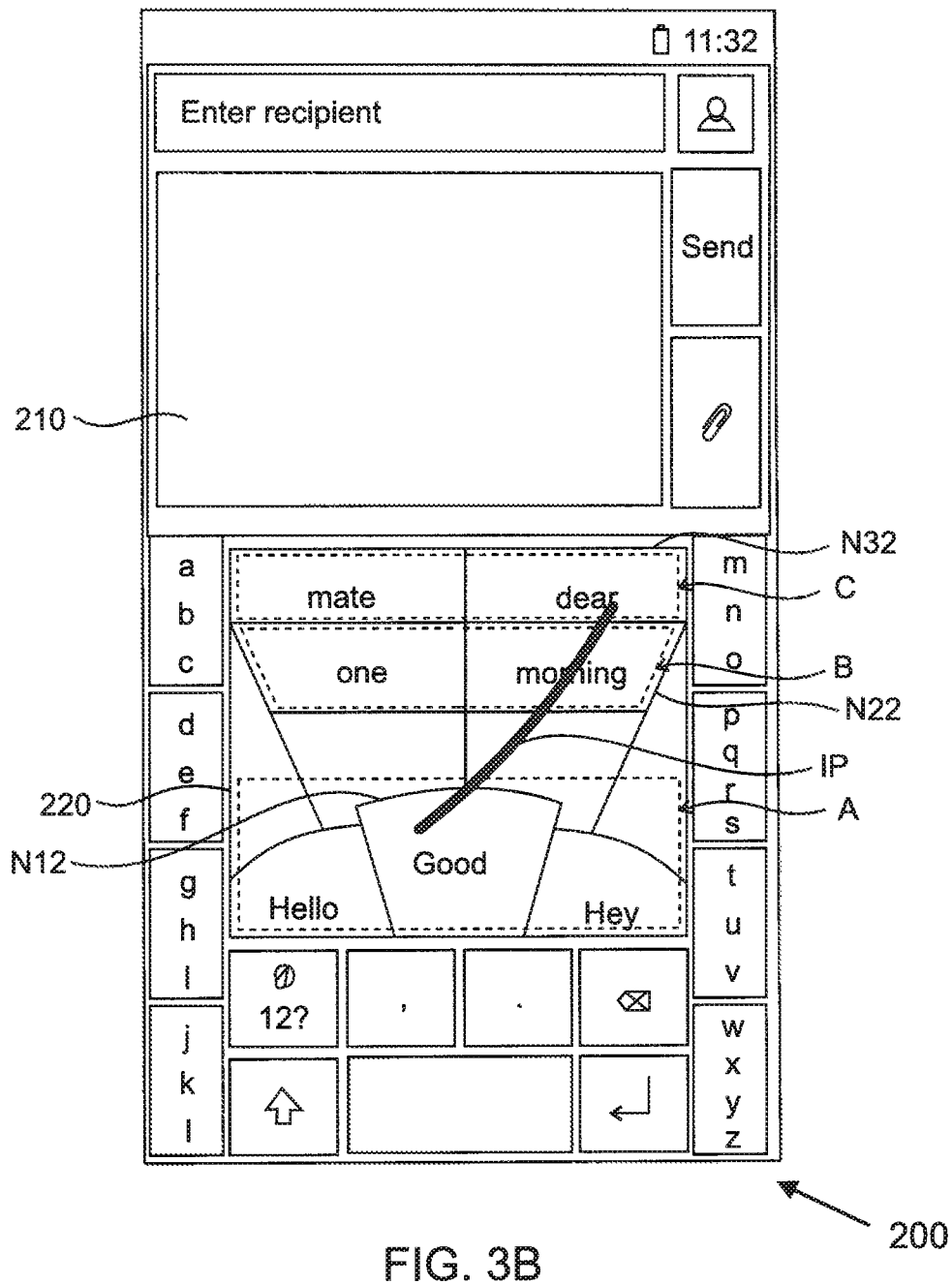
FIG. 3B illustrates a second view of a first user interface for the word prediction system operating on the cellular telephone illustrated in FIG. 1.

The user can trace a continuous input pattern on the touchscreen display 20 to select the desired chain of candidate words. A first input pattern IP traced by a user, for example using their finger or a stylus, is illustrated in FIG. 3B. The first input pattern IP is initiated by the user contacting the word board 220 within the primary selection node (N12) which is associated with the candidate word "Good". The word prediction system 120 determines that the user has selected the word displayed in this node (N12) and the corresponding candidate word is inserted into the text input field 210. The user then continues to trace the first input pattern IP which continues through the secondary and tertiary selection nodes (N22) and (C32) containing the candidate words "morning" (B1) and "dear" (C1). The word prediction system 120 thereby determines that the user has selected these further words and they are entered into the text input field 210 in turn. The candidate words are inserted inline in the text input field 210 as the first input pattern IP is traced by the user. The candidate word associated with a given selection node can be inserted inline in the text input field 210 if the input pattern IP remains within a selection node beyond a threshold time period (for example the user hovers over a particular candidate word); or as the input pattern IP exits a selection node in a particular direction. A range of parameters can be used to determine which candidate words are to be input. For example, the word prediction system 120 can monitor the input pattern to identify one or more of the following: inflections, pressure changes, dwell time, ordering of words within the cluster, order of words displayed in the cluster, amount of input pattern within the node boundary.

In the event that the desired candidate word is not displayed, the user can select new candidate words for display in the word board 220. With reference to FIG. 3C, the user can slide their finger to trace an input pattern IP to the left or right within the region of the first tier A (represented by a rectangle 330). Upon detection of this lateral gesture, the word prediction system 120 will display further candidate words in the first tier A and refresh the candidate words displayed in the second and third tiers B, C. If the speed of the lateral gesture is quick, for example above a predefined speed threshold, the word prediction system 120 will replace all of the candidate words in the first tier A. If the speed of the lateral gesture is slow, for example below a predefined speed threshold, the word prediction system 120 will replace one of the candidate words displayed in the first tier A depending on the origin and direction of the lateral gesture. For example, if the initial suggestions in the first tier A are A3, A1, A2 (from left to right) and the user starts a slow gesture from A2 or A1 towards the left hand side, the resulting suggestions will be A1, A2, A4 (from left to right), where A4 is the next most likely candidate word to be inserted. Alternatively, if the slow gesture starts from A3 or A1 towards the right hand side, the resulting suggestions will be A4, A3, A1 (from left to right), again where A4 is the next most likely candidate word. The user can thereby cycle through candidate words by tracing a lateral input pattern IP at a slow speed. Thus, the cycling procedure can be controlled based on the speed at which the input pattern IP is traced. In an alternate arrangement, cycling through the candidate words could be represented by a rotary motion of the candidate words, similar to the rotation of a rotary dial.

The side keys 240 forming the first and second columns 220, 230 can operate in a predictive (ambiguous) mode like the keys in a conventional 12-key layout. The user can tap and release any of the side keys 240 to enter one of the mapped characters according to the top suggestions generated by core for that key in predictive mode. A long press on any of the side keys 240 can generate a selection window 340 (or bubble) with all the base characters mapped to that key, as shown in FIG. 3D. The user can select the desired character from the selection window and the character is entered upon release. If the user slides his/her finger from a first side key 240 to a second side key 240 and then releases, a character from the second side key 240 will be entered. When a selection window is displayed for a long press, then tracing an input pattern onto the selection window will display a grid 350 with all the accented characters mapped to that side key 240, as shown in FIG. 3E.

With reference to FIG. 3F, the user can directly select any candidate word from the word board 220 by tapping the touchscreen display 20. The candidate word, which in the illustrated example is "morning" (B1), is then entered directly into the text input field 210. As shown, the selected candidate word is highlighted to provide feedback to the user.

Figure 3G:
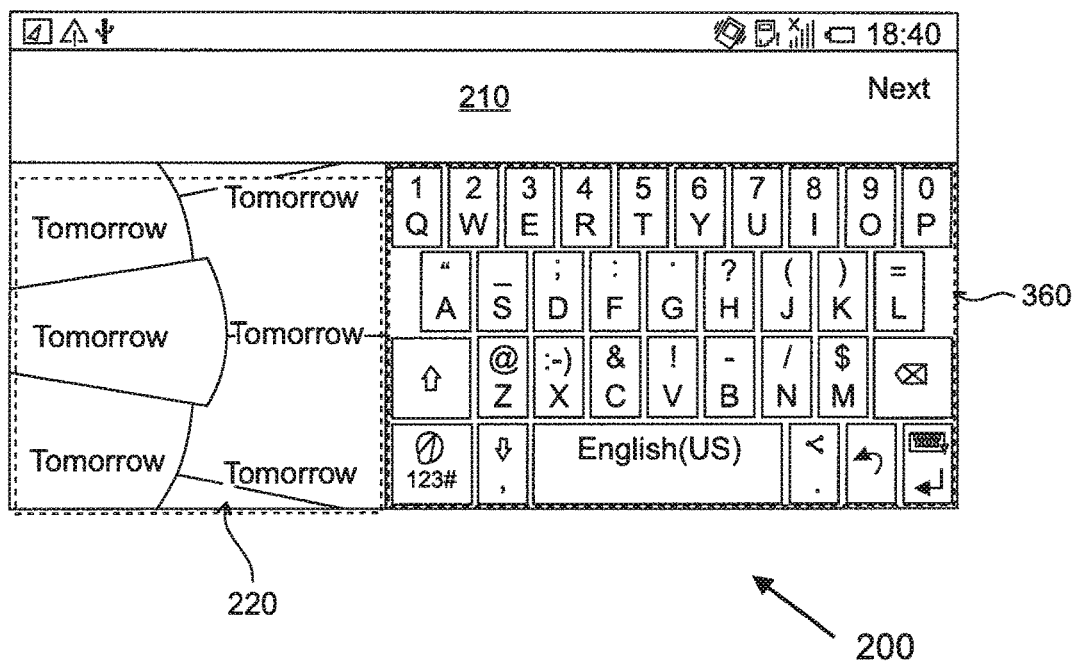
FIG. 3G illustrates a seventh view of a first user interface for the word prediction system operating on the cellular telephone illustrated in FIG. 1.
Figure 3H:
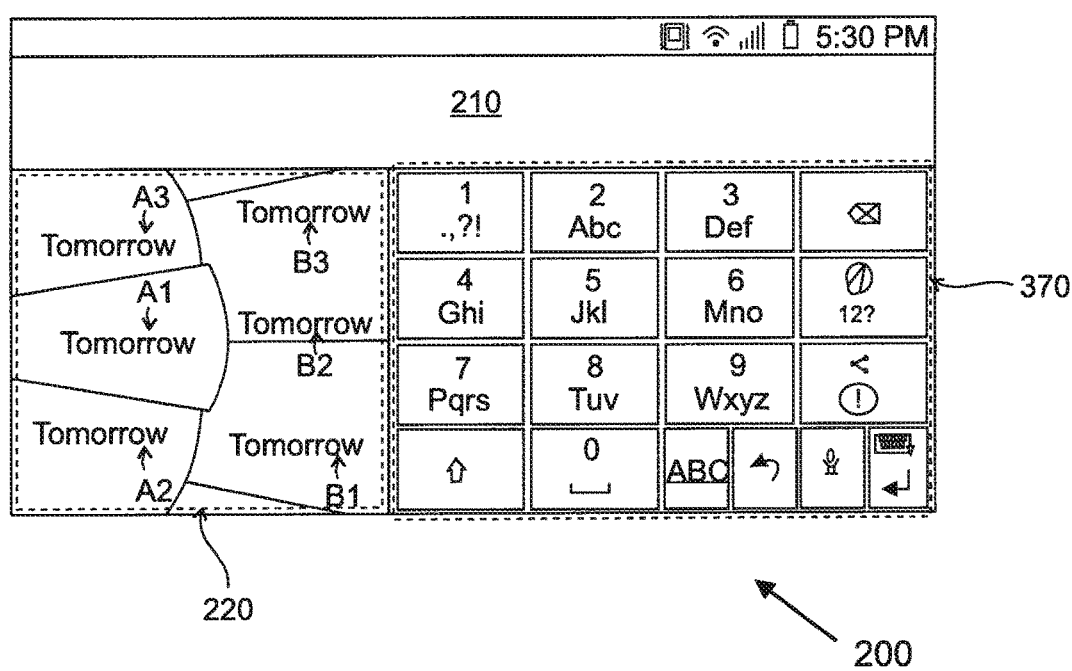
FIG. 3H illustrates an eighth view of a first user interface for the word prediction system operating on the cellular telephone illustrated in FIG. 1.

The first GUI 200 is illustrated in a landscape mode in FIG. 3G. In the illustrated arrangement, a full QWERTY keyboard 360 is provided with a key associated with each letter of the alphabet to remove the need to disambiguate key inputs. The word board 220 is illustrated with only first and second tiers A, B, but the operation of the word prediction system 120 is not materially affected. An alternative approach is to implement a 12-key keyboard to facilitate the display of first, second and third tiers A, B, C, as shown in FIG. 3H.

The first GUI 200 can augment the word board 220 with a graphical framework or lattice to highlight viable word chains (i.e. sequences or paths of candidate words which can be meaningfully combined). The word prediction system 210 can identify the word chains based on grammatical rules and structures. The graphical representation of the word chains can help the user to navigate through the candidate words. The representation of words along the word chain can be modified to provide an indication of the likelihood of selection of that word, for example based on a calculated probability. For example, the method could comprise varying one or more of the following: font size, font colour, transparency, font format, underlining, emboldening, etc.

A space can be added for every word being inserted inline. Alternately, when the next word is inserted, the space can be added for the previous word. A space may or may not be added at finger lift-off. Tapping on any word in the word board will input the word with a space. A gesture could be defined to add a space. The space could be inserted when the trace pattern exits a region associated with a selected node or enters a region associated with a target node.

The user can be allowed to undo any word insertion(s), for example by a gesture such as press and hold or tap. The system will constantly learn the users' style of text input, so that the quality of word cloud will improve over time based on the learning's. Frequently used phrases may be predicted as a single node, thereby reducing the time to input further.

Figure 4:
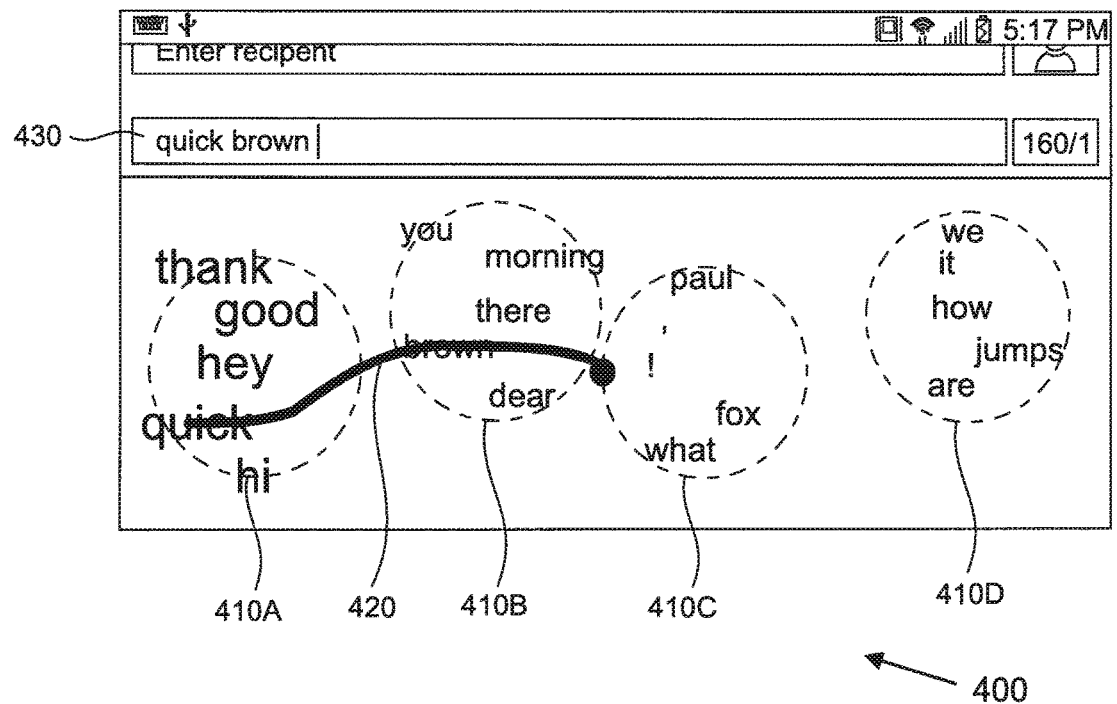
FIG. 4 illustrates a second user interface for the word prediction system operating on the cellular telephone illustrated in FIG. 1.

A second GUI 400 for the word prediction system 120 is illustrated in FIG. 4. The second GUI 400 comprises a plurality of word clusters 410A-D each including one or more of the following: a word, a phrase or a sentence. The word prediction system 120 is configured to group related candidate words into the word clusters 410A-D. The user can trace a continuous input pattern 420 to select candidate words contained within the respective word clusters 410A-D. The selected words are then inserted sequentially inline into a text input field 430 as the input pattern 420 is traced. When the selected words are inserted inline, the word traced by the user is presented in the editor with a visual difference from the previous word(s) entered by the user. For example, the word inserted inline could be displayed in the editor underlined and/or italicized and/or a different colour and/or highlighted and/or inside a boxed etc. The word is still inserted in the editor, just that the attribute of the displayed word is words differs from the rest of the text displayed in the text input field. This provides a visual indicator to the user on the word being traced and identified by the system, thereby allowing the user to act quickly on the word inserted inline, for example to perform an undo action.

In the illustrated example, the word clusters 410A-D are arranged in a sequence representative of a typical sentence structure. Moreover, the words displayed in each word cluster 410A-D can be related to each other. The candidate words could be related by grammatical rules, for example the candidate words in each word cluster 410A-D could all be nouns, verbs or adjectives. The candidate words could be related by context, for example the candidate words in each word cluster 410A-D could relate to a particular subject or topic. The candidate words can be selected from a database stored on the on-board memory 130. The database can comprise links between data entries to identify relationships between the candidate words. The relationship between the words in each word cloud 410A-D can be established based on natural language processing rules, such that any of the available paths are valid and form relevant texts.

The word clusters 410A-D are displayed on the touchscreen display 20 spaced apart from each other to improve clarity. The candidate words displayed in each word cluster 410A-D could be fixed, for example until the input pattern 420 enters a selection node. Alternatively, the candidate words displayed in each word cluster 410A-D can be updated in real time as the input pattern 420 is traced by the user. For example, if the input pattern 420 is currently associated with a first word cluster 410A, the word prediction system 120 could be configured to refresh the candidate words in one or more of the other word clusters 410B-D. The word clusters 410A-D could comprise one or more of the following: a word, a phrase and a sentence.

With reference to FIG. 4, the GUI 400 is illustrated with an input pattern 420 traced through several consecutive word clusters 410A-D. A further operating method could allow the user to start with any word in a first word cluster 410A and drag to another word in a different cluster 410B-D to continuously form sentences or phrases. The user can formulate a string of words by dragging the word sequence to different word clusters 410A-D and/or by dragging candidate words to the word sequence. The next word cluster can be displayed as the user traces out from a current cluster.

In a modified arrangement, the user could temporarily add candidate words to a selection area prior to the insertion inline in the text input field 430. The candidate word(s) can, for example, be selected by tracing the input pattern 420 through the selection nodes for the respective candidate word(s) displayed in said word clusters 410A-D. The user could add the words in the desired sequence and optionally perform a sorting step before they are inserted inline. Alternatively, the word prediction system 120 could automatically sort the selected words into an appropriate order, for example based on defined rules of grammar, syntax and semantics. The user could, for example, drag and drop candidate words to a selection area. Alternatively, the user could tap a candidate word to select that word and then tap the selection area to indicate that the selected candidate word is to be added to the selection area. The user can subsequently rearrange the sequence of candidate words within the selection area. For example, the user can select one or more words in the selection area and then drag the selected word(s) to the desired location relative to other words within the selection area.

The words in the cluster could be arranged in varying font size, colour, format etc. depending on their perceived relevance. The context, uni-frequency, beginning of editor, underlying application information and other context of use information can be used to decide this variation in font, as shown in FIG. 4. It will be appreciated that a larger font is indicative of a higher relevance.

The clusters can be predefined or can be custom defined by the user. A list of possible clusters is outlined below by way of example:

User Defined Clusters—The user can define a set of words which can appear as a cluster. And any one swipe gesture can be assigned to make this user defined cluster appear. For example, the user can define a cluster comprising their friend's names. The user can define a trace pattern gesture, such as a loop, associated with this cluster. When the user traces this pattern gesture on an empty area on the screen, the user-defined cluster is displayed in proximity to the region on the screen where the pattern gesture was traced. The user can glide through the words within the custom cluster and select the desired word, such as the name of a particular friend. This concept can be extended for multiple clusters with a dedicated pattern gesture assigned to each cluster.

Abbreviations Cluster—A selection of user defined and/or predefined abbreviations can be shown as suggestions in an abbreviation cluster and the expansion can be inserted when the input pattern is traced to the abbreviation.

Emoticon Cluster—A selection of emoticons can be displayed in a cluster for selection by the user.

A further refinement of the word cluster is to identify a phrase flow within the word cluster. A valid sequence of words or a phase can be identified in one or more of said word clusters. The representation of the words in that particular sequence can be modified, for example by changing their display colour or font, to distinguish them from other words in the word cluster. This technique can be applied in a single word cluster or across multiple word clusters. For example, If the words "have", "good" and "hello" are displayed in a first word cluster; and the words "morning" and "there" are displayed in a second word cluster, the word prediction system can identify the phrase "good morning" and display these words in the same colour to facilitate recognition of the phrase.

The next word suggestions and/or the number of suggestions in each subsequent word cluster can be proportional to the probability of a word. For example, in the case of a first word cluster containing the words "hello" and "good", the word prediction system may determine that the probability of the user selecting the word "hello" is 70% and the probability of the user selecting the word "good" is 30%. In a second word cluster, the word prediction system will insert more next word suggestions for "hello"

Furthermore, the user can bring up custom clusters based on custom gestures. By way of example, an email identification cluster can be brought up by tracing a custom gesture like "@". Equally, the user can bring up standard clusters, such as a numerical cluster or a symbol cluster, based on a predefined gesture or a custom gesture. Furthermore, the user can bring up a custom keyboard or a standard keyboard (for example a 12 Keypad, a cyclic keypad, a concentric keypad or others) with a predefined or custom gesture. The keyboard can be displayed proximal or around the current point of contact. Alternately, a custom keyboard or a standard keyboard (for example a 12 Keypad, a cyclic keypad, a concentric keypad or others) can be floating near the current point of contact at all times. This cluster of keys can be shown in a small size or faded or visually different form until the user drags in that direction. When the user drags towards this key cluster, then the intended keypad size is displayed for the user to glide through. The user can trace a continuous input pattern through the keys to input a sequence of data strings. Alternately the user can tap on the keys to input. Once the input of specific characters is complete, the user can dismiss the key cluster by an event or a gesture or hitting a dedicated close key. The word cluster can be refreshed based on an input by the user. The word cluster for the next likely word can start from the point of finger release on the key cluster or closer to the key cluster. The key cluster can have a backspace and/or undo options.

The candidate words for display in a word cluster can be grouped based on particular topics. For example, each topic can be represented by creating a collection of representative text of the topic. The topic labels can be assigned to a document or segment of document either manually or automatically by an unsupervised algorithm to group similar documents in topic like clusters. The topics can be organized as hierarchical collection or as a disjointed set of topics. In the case of a hierarchical system, the words could be arranged as follows:

Topic level 1—hobbies, sports, movies
Subtopics for each topic in topic level 1:
In sports, subtopics could be cricket, hockey etc.
In hobbies, subtopics could be chess, reading etc.

The word prediction system can determine a current topic with reference to the part of the conversation that has taken place so far and updated periodically. Normally a conversation may discuss multiple topics. The words that occur in most of the topics are removed from the conversation. (For example, if a word occurs in 85% or more of the topics, that word is skipped as it may be a common word not specific to any topic.) The document similarity between a current conversation and each topic can be calculated. In the case of the above example, if the current text is "I like movies", the probability that the conversation relates to each available topic (i.e. "hobbies", "sports" and "movies") can be calculated as follows:

P(movies|current text)=probability that the topic is movies given that current text is "I like movies".

Similarly,

P(sports|current text) and P(hobbies|current text)

When calculating the probability of a candidate word, in addition to the probability of that word based on the previous words (uni-frequency, context, syntax and semantics etc), we also consider the probability of that word with respect to the topic of conversation.

h1, h2—history—previous words
T—topic
P2(w|h2)=probability of the word based on the previous words (uni-frequency, context, syntax and semantics etc)
P1(w|h1, T)=probability of the word based on the previous words and topic of conversation=$\Sigma t \in topics$ P(t|h1)*P(w|h1, t)
P(t|h1)=probability that t is the topic given the history h1
P(w|h1, t)=probability of the candidate word given the history h1 and topic t Final probability of the word may be computed as =P(w)=P2(w|h2)*[P1(w|h1,T)]α

(α—parameter)

(OR)

Final probability of the word may be computed as =P(w)=((1−α)*P2(w|h2)+(α*P1(w|h1,T))

(α—parameter)

According to one aspect of the present invention, the word prediction system 120 can be configured to display only significant (key) words in the word clusters 410A-D. The significant words can be flagged in the database or can be identified based on historical usage patterns. The second GUI 400 can be configured so as not to display short or insignificant words (based on predefined rules, for example word length, or by specific markers in the database). These short or insignificant words are typically disposed between significant words and, using semantic analysis can be added automatically during input. This technique enables the user to trace a reduced input pattern 420 which selects only significant words for input. The intervening short words can be inserted automatically, for example as the significant words are added to the text input field 430. A similar approach can be applied automatically to add punctuation, for example based on contextual learnings and uni-frequency, etc. These techniques are equally applicable to the first GUI 200 described herein. Words such as definite and indefinite articles ("a", "an", "the") can be filled automatically in this way. These words if they show up in the suggestion list to be displayed, can be skipped and the next word will be shown. When the next word is selected, the skipped word will be automatically inserted. By way of example, if the phrase is "have a good day", the words "have" "good" "day" will be shown as suggestions. When "good" is selected, the indefinite article "a" will be inserted automatically.

The user can cancel a current input pattern 420 by performing one or more of the following actions: extending the input pattern 420 to an edge of the word board or into the text input field/editor space; quickly making a random movement; or extending the input pattern 420 to a dedicated space on the word board. Similarly, the user can refresh the candidate words by performing one or more of the following actions: shaking the device (which may be detected by an inertial motion detector); drawing a circular gesture at the edges and moving towards the opposite direction; extending the input pattern 420 into a refresh node/region, for example provided at the opposite end of the direction of trace. The candidate words will be refreshed and the next in sequence cluster or word will be present in the order of the direction the user takes. These techniques allow the user to refresh the candidate words whilst tracing a continuous input pattern 420, thereby removing the need for the user to lift off from the touchscreen display 20. Alternatively, or in addition, the candidate words can be refreshed when the user lifts their finger (or stylus) off the touchscreen display 20.

In a further arrangement, a multi-touch approach can be adopted to detect a continuous trace pattern comprising first and second traces in respective first and second input directions. The user can perform a first trace in a first direction, for example from a start point to one side of a display, with a first finger (such as an index finger). The user can then change direction, whilst maintaining the continuous trace pattern (i.e. without lifting off the display screen), and perform the second trace in a second direction. The user can perform the second trace using a second finger (such as a middle finger). The system will detect a momentary multi-touch event when the change in direction occurs (i.e. when the first and second fingers both contact the display). The multi-touch event could be identified as two simultaneous contacts, for example on a multi-touch display; or as consecutive contacts, for example to simulate multi-touch on a single-contact point display (i.e. a display which does not support multi-touch). An alternative approach would be to detect an angular change in the input direction of the trace pattern. For example, the displayed candidate words could be refreshed when an angular change exceeding a predefined threshold is detected. The threshold could, for example corresponding to a reversal of the input direction. In this arrangement, the method can comprise detecting a major input direction of the input pattern.

An option can be provided to enable the user to apply a uniform change to all of the candidate words displayed in one or more of the word clusters 410A-D. For example, the word prediction system 120 can be configured to enable the user to change the tense of all of the words in one of the word clusters 410A-D. A tense selection node could be provided to allow the user to specify past, present or future tense. The word prediction system 120 can alter word endings based on the selected or change the candidate words. The tense selection node could also be applied to alter the tense of text previously inserted into the text input field 430.

Figure 5:
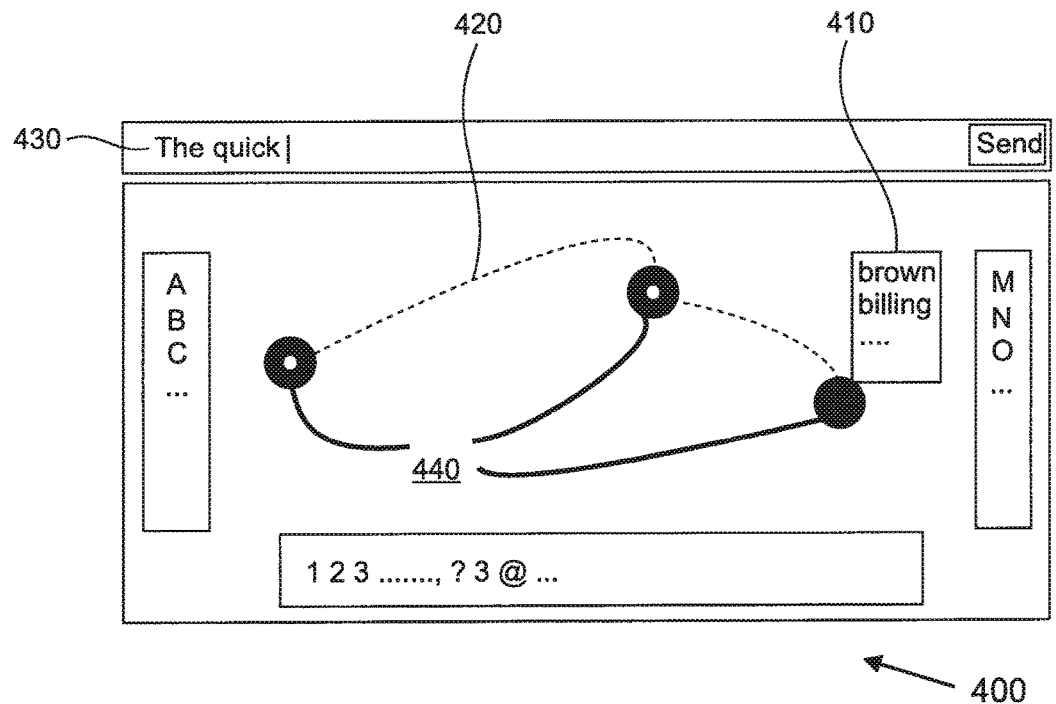
FIG. 5 illustrates a modified version of the second user interface illustrated in FIG. 4.

A modified version of the second GUI 400 is illustrated in FIG. 5. This arrangement is referred to herein as a 'blind keyboard' since the keyboard can be omitted from the display. The user can start anywhere on the screen and move to any location. At the start point (i.e. the initial contact location), the word prediction system 120 displays a word, a word cloud or a word list. As the user traces a continuous input pattern 420 a specific distance or creates an inflection, the next word cloud 410 is displayed. The user can choose the direction of the trace pattern on a keyboardless user interface.

The top word is committed as the input pattern 420 is traced. When the user wants an alternate word, the input pattern is traced on to the displayed word or in an intuitive direction up/down for a list or angles for a word cloud 410. A user can prompt the display of an alternate word cloud 410 by tracing the input pattern 420 away from the displayed word cloud 410. The direction in which the input pattern 420 is traced could be associated with a particular function, for example to display verbs rather than adjectives in the word cloud 410. A custom gesture can also indicate that the user is moving from trace to selection mode; or a detected pause or pressure may indicate the same transition etc. For a multi-touch application, the user can use a multi-touch gesture to select the displayed word.

A selected word is inserted into the text input field 430 and the selection is illustrated by a graphical marker 440 displayed on the screen. The GUI 400 can insert punctuations or numerics or specific characters from a numeric/alphanumeric user interface or a character keyboard. Equally, the GUI 400 and display a symbol interface or an emoticon interface for inputting respective symbols or emoticons. The appropriate interface can be displayed by detecting a corresponding gesture formed by the input trace pattern. For example, when the GUI 400 detects a first gesture, such as tracing an or an '@', a punctuation interface can be displayed; and when the GUI 400 detect a second gesture, such as tracing a circle in an anticlockwise direction, a symbols interface can be displayed. Alternatively, a tap or gesture after finger release anywhere on the display or on a dedicated region can bring up the relevant input interface. The GUI 400 can display alternate keyboards along the edges or other regions of the screen for quick input. A further possible gesture is to trace an '8' to display a numerical interface.

Figure 6A:
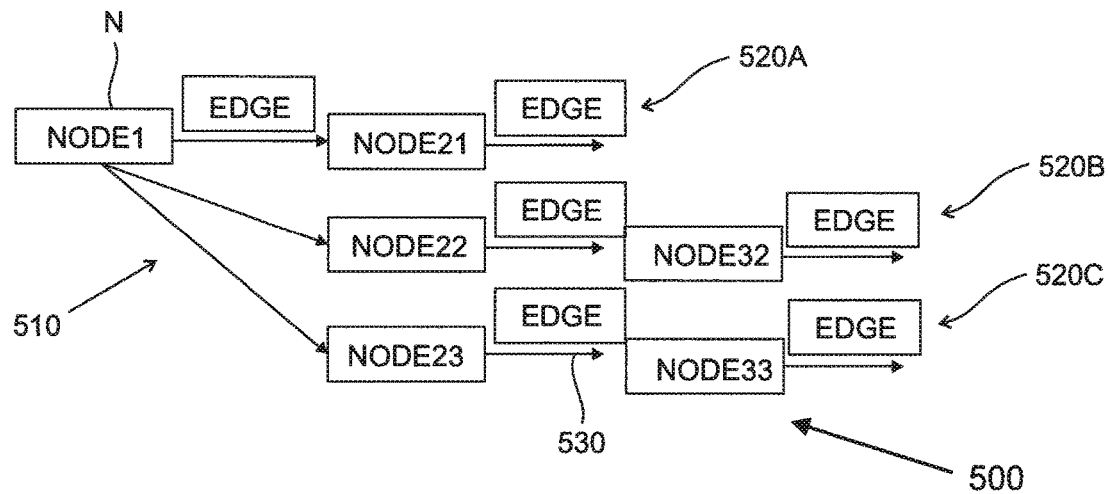
FIG. 6A illustrates a first view of a third user interface for the word prediction system operating on the cellular telephone illustrated in FIG. 1.
Figure 6B:
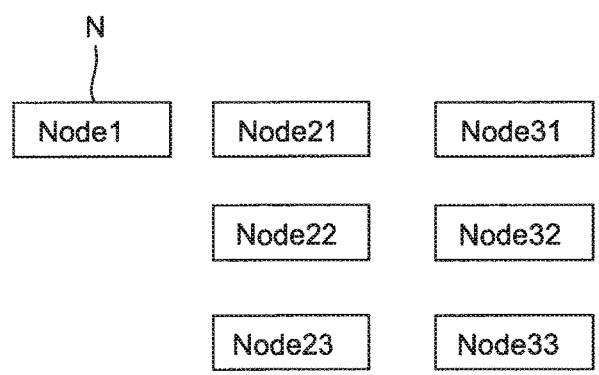
FIG. 6B illustrates a second view of a third user interface for the word prediction system operating on the cellular telephone illustrated in FIG. 1.
Figure 6C:
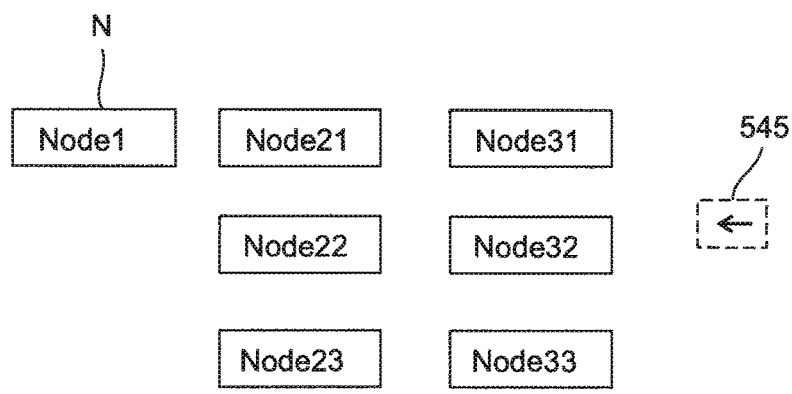
FIG. 6C illustrates a third view of a third user interface for the word prediction system operating on the cellular telephone illustrated in FIG. 1.

A third GUI 500 for the word prediction system 120 is illustrated in FIGS. 6A-E. The third GUI 500 comprises a word cloud 510 comprises an array of nodes N. The nodes N each contain an entry, such as a word, phrase, number, punctuation mark or symbol, for selection by the user. The nodes N are displayed on the touchscreen display 20 and may be framed (as shown in FIG. 6A) or frameless (as shown in FIG. 6B). The third GUI 500 is configured to display the candidate words in a defined sequence for selection by the user. Thus, the nodes N are arranged to form a series of parallel word chains 520A-C, each word chain 520A-C representing a possible string of words to be input by the user. To highlight the respective word chains 520A-C, a graphical element 530 (such as an arrow) can be displayed between consecutive nodes N.

Figure 6D:
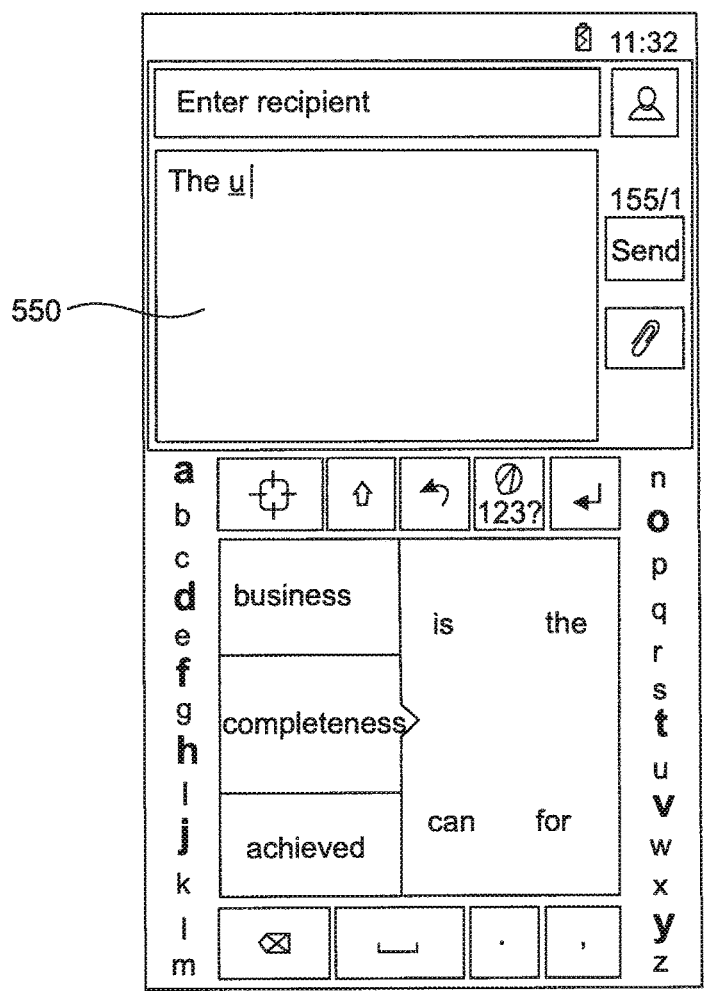
FIG. 6D illustrates a fourth view of a third user interface for the word prediction system operating on the cellular telephone illustrated in FIG. 1.

The user can trace a continuous input pattern 540 along one of the word chains 520A-C to enter each candidate word into a text input field 550 (shown in FIG. 6D). The trace pattern 540 has a trace input direction determined by the configuration of the nodes N on the touchscreen display 20. The trace direction extends from a first node N1 and progresses through consecutive nodes N2, N3 and so on. In the illustrated arrangement, the trace direction is generally from left to right, but it could be from right to left; top to bottom; or from bottom to top. Moreover, the trace direction could be reversed, for example to allow the user to continue to trace the input pattern once they have reached a continuation node 545. When the input pattern extends to the final node N3 of a word chain 520A-C and a lift-off is detected, the word prediction system 120 can determine that a sentence has been completed and automatically insert a period (full stop). The word prediction system 120 can automatically refresh the candidate words displayed in the nodes N arranged for tracing in the same direction or the opposite direction. A current input pattern can be cancelled by tracing the input pattern to an edge of the touchscreen display 20. The size and/or position of the continuation node 545 can be altered in real time to allow the input pattern 540 to be continued.

The third GUI 500 can be adapted to allow the user to modify the candidate words, for example to apply inflections. Specifically, if the word prediction system 120 detects that a node N is selected for a time period longer than a defined time threshold, inflections associated with that node will be populated around that the node (either vertically or radially) for selection by the user. Once an inflection is selected, the path traversal will not change and only the subsequent node will refresh. Alternatively a small arrow or symbol can be shown on the node N to enable the user to traverse to corresponding inflections.

The word prediction system 120 is configured to determine which of the displayed word chains 520A-C is most likely to be selected by the user. The most likely word chain 520A-C can automatically be highlighted to assist the user. Alternatively, the user can select a path indicator (not shown) to highlight the word chain 520A-C most likely to be selected by the user.

Figure 6E:
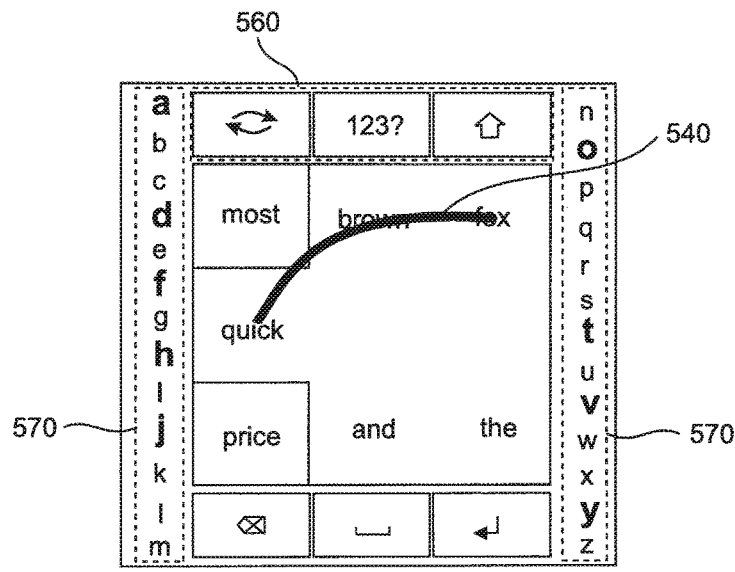
FIG. 6E illustrates a fifth view of a third user interface for the word prediction system operating on the cellular telephone illustrated in FIG. 1.

By way of example, two implementations of the third GUI 500 are illustrated in FIGS. 6D and 6E. The nodes N in these arrangements are frameless and the user is free to trace the input pattern 540 within the word cloud 510. A refresh button 560 is provided to allow the user to refresh the candidate words displayed within the word cloud 510. Moreover, separate selection regions 570 associated with each letter of the alphabet are displayed in columns on each side of the word cloud 510. The selection regions 570 enable the user to enter letters to assist with the identification and display of candidate words from the database. To assist the user, the word prediction system is also configured to highlight the letters which are most likely to start the next word. The letters are highlighted by displaying them in a larger font size, as shown in FIG. 6D.

Figure 7:
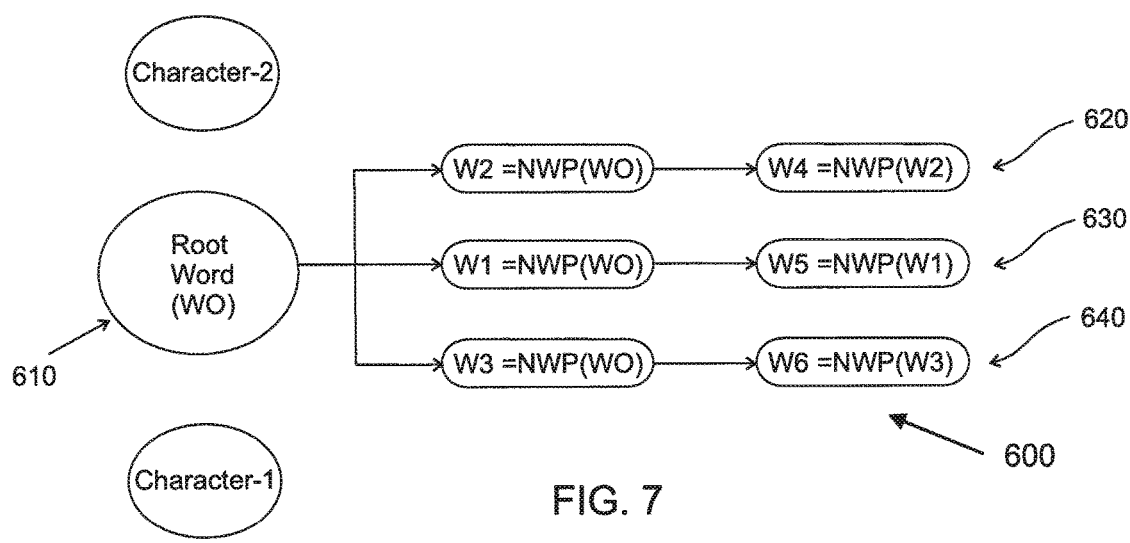
FIG. 7 illustrates a fourth user interface for the word prediction system operating on the cellular telephone illustrated in FIG. 1.

A fourth GUI 600 is illustrated in FIGS. 7 and 8. As shown in FIG. 7, the input sequence initiates from a first node 610 and the subsequent candidate words (referred to as next word predictions (NWPs)) are then displayed in first, second and third word chains 620, 630, 640. The GUI 600 provides a hierarchal input system selectively operating at a first level (Level I), a second level (Level II) and a third level (Level III). The first level (level I) provides word completion/ prediction based on character input; the second level (level II) provides next word prediction; and the third level (level III) provides phrase predictions.

Figure 8A:
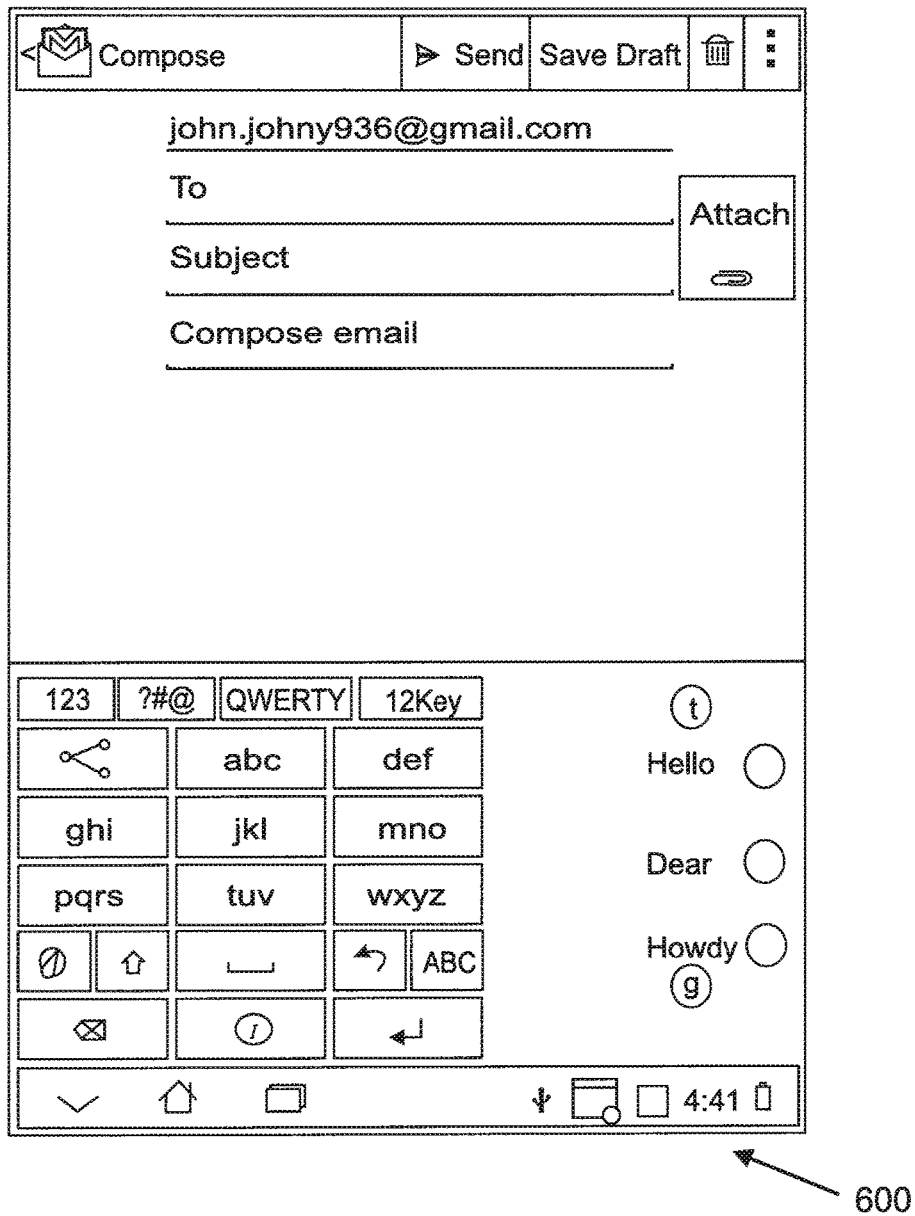
FIG. 8A illustrates a first interface embodied in the fourth user interface illustrated in FIG. 7.

At first install, the fourth GUI 600 operates in the first level (level I). The word suggestions offered to the user are based on generic context and the user is provided with a simple list of candidate word suggestions based on character inputs. The operation of the fourth GUI 600 in the first level (level I) is illustrated in FIG. 8A.

Figure 8B:
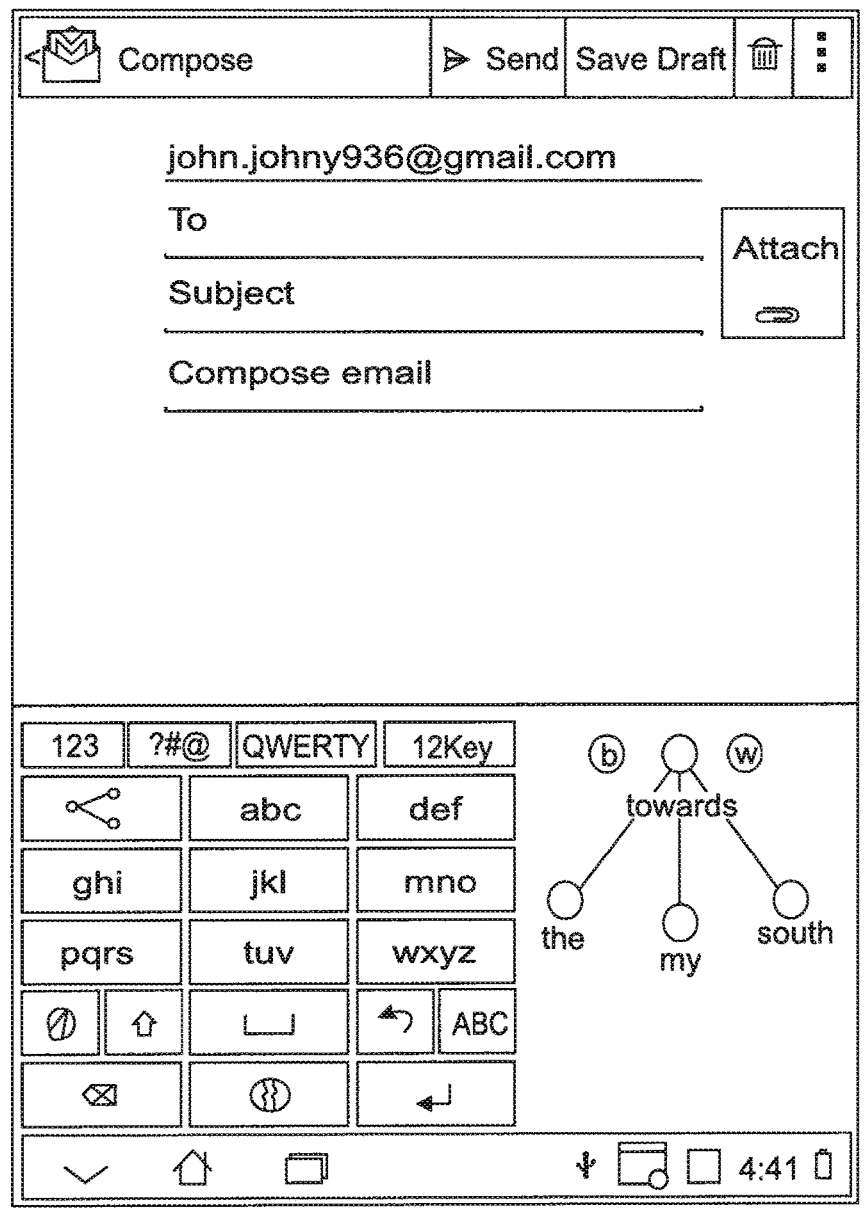
FIG. 8B illustrates a second interface embodied in the fourth user interface illustrated in FIG. 7.

Following continued use, the word prediction system has sufficient learning to unlock the second level (level II). The user can then continue to use the first level (level I) and/or the second level (level II). The second level (level II) is an intermediate user interface between the interface that lets users tap and select suggestion and glide and select phrases continuously. Whilst the GUI 600 is operating in the second level (level II), the user can select two consecutive words (or potentially three consecutive words) using a continuous trace pattern. The operation of the fourth GUI 600 in the second level (Level II) is illustrated in FIG. 8B.

The continued use of the word prediction system increases accuracy and enables the accurate prediction of a sequence of words, for example forming a phrase. The fourth GUI 600 then permits operation in the third level (level III) in which the user can input three or more words consecutively by tracing a continuous input pattern. When operating in the third level (level III) the user can input complete sentences using a continuous trace pattern.

When operating in the third level (level III) the word prediction system according to the present invention allows the user to glide through from the root node to the intended next word prediction from amongst three candidate words. The selected candidate word then behaves like the root node and gives three candidate words for the user to select from. The fourth GUI 600 is not static but gives the path that a user can glide on to continuously select candidate words. The operation of the word prediction system to output the next word prediction (NWP) will now be described with reference to FIG. 8C:

Root Word: a
Paths from NWP for Root Word "a": a1, a2, a3 in order of accuracy from core.
View1: a+(a1, a2, a3)
Path taken: a→a1
New Root Word: b (corresponding to selected a1 location)
Paths from NWP for Root Word "b": b1, b2, b3 in order of accuracy from core.
View2: b+(b1, b2, b3)
Path taken: b→b2
New Root Word: e (corresponding to selected b2 location)
Paths from NWP for Root Word "b": e1, e2, e3 in order of accuracy from core.
[Process repeated until input pattern terminated.]

Figure 8C:
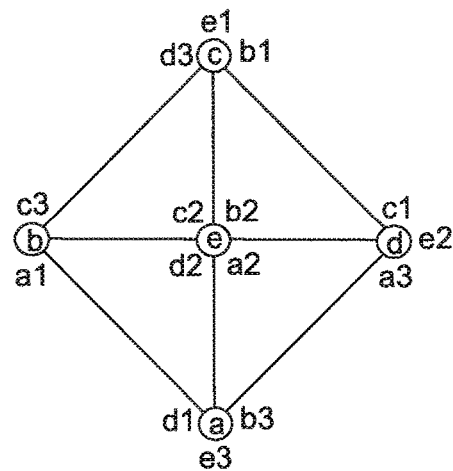
FIG. 8C illustrates a third interface embodied in the fourth user interface illustrated in FIG. 7.

The candidate words for selection by the user are displayed at the apexes of a lattice structure made up of a series of selection paths (which may or may not be displayed). As illustrated in FIG. 8C, the lattice structure in the present embodiment forms a diamond configuration having four outer selection nodes (a, b, c, d) and a central selection node (e). The word prediction system 120 is configured to select three candidate words which are likely to follow the current input word. The selected candidate words are displayed at the end of the respective selection paths radiating outwardly from the root node associated with the current input word. The user can select one of the candidate words by tracing the input pattern along the selection path from the root node to the next node associated with the candidate word to be selected. The selected node then becomes the new root node and the candidate words displayed for selection are updated. The root node thereby alters dynamically in dependence on the input pattern traced by the user and can be any one of the selection nodes a-e.

The word prediction system selects three new candidate words likely to follow the newly selected word. The three selected candidate words are displayed at respective nodes positioned at the end of the selection paths radiating from the new root node. The candidate words displayed within the lattice structure are refreshed each time one of the displayed words is selected. This dynamic process can be repeated to enable the user to trace a continuous input pattern within the lattice structure. A continuous input pattern can be traced within the lattice structure to input a complete phrase or sentence. The word prediction system can automatically insert spaces between the selected words, for example each time the input pattern exits or enters a region associated with a selection node or the input pattern passes a threshold point along the respective selection path. Rather than trace a continuous input pattern, the user could make a point contact (for example by tapping a touchscreen) with each selection node to select the corresponding candidate word.

The fourth GUI 600 can be configured automatically to switch between the first, second and third levels (level I, level II, level III) and/or the user can select the desired operating mode. Thus, a user can begin to input text using a character prediction system (level I) and then switch to a word prediction system (level II) or a phrase prediction system (level III). The functionality provided by the different levels can be controlled based on the certainty of character, word or phrase predictions. For example, if the user is beginning to input text, there may be insufficient certainty to predict words or phrases so the fourth upper case GUI 600 will operate exclusively in the first level (level I). As the user inputs more text, the word prediction system can assess the context and the certainty with which words can be predicted increases. The fourth GUI 600 may then activate the second level (level II) to enable the user to select words. The input of subsequent words will further increase the certainty with which phrases can be predicted and the fourth GUI 600 may then activate the third level (level III) to enable the user to select phrases.

The hierarchal system proposed in the fourth GUI 600 can be expanded to integrate one or more of the other systems described herein. For example, the following hierarchal system could be implemented:
Level I—a word selection system;
Level II—a word chain system;
Level III—a word cluster system;
Level IV—a 'blind' keyboard system.

The levels can be activated/de-activated based on an accuracy probability factor and/or the amount of contextual information available.

An alternate approach for implementing the fourth GUI 600 described herein is as follows:
Level 1: the word prediction system provides next word prediction if no character has been input to the current word. Alternatively, the word prediction system provides word completions if some characters have been input for the current word.

Level 2: If no character has been input into the next word, the word prediction system provides the next word prediction and the next-next-word prediction. If one or more characters of the next word has been input, the word prediction system can provide word completions and the next word predictions of those completions. The user can optionally trace through two words at a time.

Level 3: If no character has been input into the next word, the word prediction system provides more than two levels of word predictions. The user can input a phrase, sentence etc. via a continuous trace.

The intention of the three levels is to provide, at least in certain embodiments, a very simple well known interface to the user at system install initially. As the word prediction system learns the context of the user, it can migrate to the second level of text entry where the user is comfortable with more than a word being input in a single trace. As the word prediction system learns the user's style thoroughly, there is increased confidence in the quality of predictions which can be offered and the user can trace through phrases and sentences (two or more words) effortlessly. The level based approach creates familiarity and acceptance with the user.

There is optionally a further level (level IV) corresponding to the so-called 'blind keyboard' described herein. In this level, the user can trace on an empty board where for the start point, dwell pojnt, inflection points the word prediction system can offer candidate words or candidate word clusters to select and trace away.

A further embodiment of the present invention will now be described with reference to FIGS. 9 to 17. The candidate words W for selection by the user are displayed in a sequence of word clusters C. In the illustrated arrangement, seven candidate words (W1, W2, W3 . . . W7) are displayed in each cluster C; and three word clusters (C1, C2, C3) are displayed together. The word clusters (C1, C2, C3) are arranged in a sequence corresponding to the order in which the candidate words W will be selected. In the illustrated arrangement, the first word cluster C1 corresponds to the current candidate word W, the second word cluster C2 corresponds to the next candidate word W and the third word cluster C3 corresponds to the next-next candidate word W. An input pattern IP is traced through the respective word clusters C to select the word(s) to be input into an editor on the electronic device. The candidate words W displayed on the touchscreen each have a selection node associated therewith. The selection nodes are illustrated as circles having the same diameter, but they could be different shapes and/or different sizes.

A selection probability is calculated for each candidate word W (for example based on one or more of said preceding words) and the candidate words W are arranged in each word cluster C based on their relative selection probabilities. In the illustrated arrangement, the candidate words W are displayed around the circumference of a circle, but other display configurations are also envisaged. The first candidate word W1 has the highest selection probability (i.e. is the most likely to be selected), the second candidate word W2 has the second highest selection probability and so on through the seventh candidate word W7 which has the lowest selection probability (i.e. is the least likely to be selected). Other factors can be used in addition to, or instead of, selection probability to rank the candidate words W in each word cluster C. For example, the candidate words W could be ranked based on frequency of use and/or context indicators. An alternate display arrangement could display the first candidate word W1 in a central position, and the further candidate words (W2 ... Wn) displayed around said first candidate word W1 in accordance with the techniques described herein.

In the present embodiment, the input pattern IP is traced on a touchscreen of the cellular telephone. The input pattern IP is created by the user touching the screen and tracing the desired pattern, for example using their finger or a stylus. Analysis of the input pattern IP is performed at interim distances along its length with a view to identifying significant points. In particular, the technique identifies a Significant Start Point (SSP), a Significant Intermediate Point (SIP) and a Significant End Point (SEP).

Figure 9:
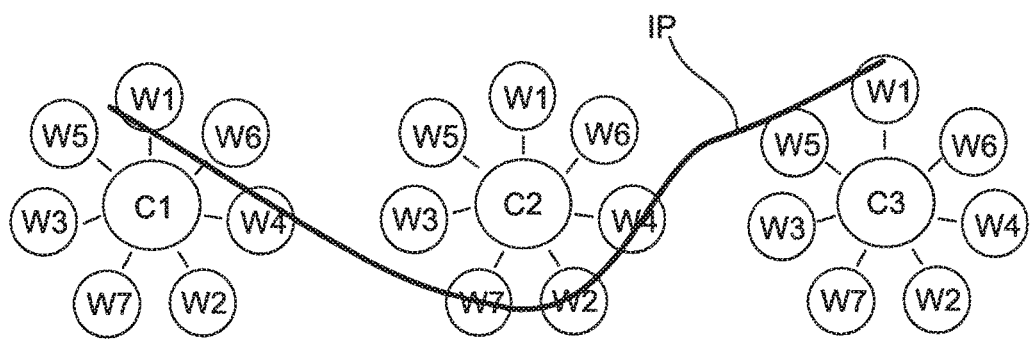
FIG. 9 illustrates a positioning arrangement of candidate words within a sequence of word clusters according to a further aspect of the present invention.

With reference to FIG. 9, the input pattern IP is initiated when the user first touches the touchscreen and an initial contact point ICP is identified in the input pattern IP. The user traces the input pattern IP by maintaining contact with said touchscreen. The user terminates the input pattern IP by lifting their finger off of the touchscreen and a final contact point FCP is identified in the input pattern IP. As described herein, the input pattern IP, including the initial contact point ICP and the final contact point FCP, are analysed to determine which of the displayed candidate words W from one or more of said word clusters C are to be selected. The selected candidate words W are each inserted inline into the editor automatically while the input pattern IP is traced by the user. Thus, it is not necessary to perform the analysis after the ICP and FCP are traced.

The initial contact point ICP, corresponding to the touch down point, is analysed and, if it falls on a selection node of a candidate word W, that candidate word W is flagged and the length of the input pattern IP extending over the selection node for that candidate word W is identified at an interim point as the user traces through the candidate word(s) W within that cluster C. The candidate word W is identified as the Significant Start Point SSP if one or more of following criteria are satisfied:

a. The trace starts on the candidate word W;
b. A significant amount of the input pattern IP extends across the selection node for that candidate word W; and
c. Optionally, a significant amount of dwell time (i.e. the duration that the input pattern IP remains over a given selection node as it is traced); and/or contact pressure (estimated as a function of a contact area on the touchscreen) for the selection node can be identified for that candidate word. Parameters other than dwell time and/or contact pressure could be used.

The characteristics of the input pattern IP can be compared with one or more predefined thresholds to determine whether they correspond to a significant parameter (such as path length, dwell time or contact pressure). If the candidate word W is identified as a SSP, that candidate word W is inserted into the editor. In the example illustrated in FIG. 9, the first word W1 in the first cluster C1 is identified as a SSP and input into the editor.

The example above covers the selection probabilities of current, next and next word predictions as:

C1W1→C2W1, →C3W1, C1W2→C2W2→C3W2 and so on; or
C1W1→C2W1, →C3W1, C1W1→C2W2→C3W4 (with a different probability of occurrence).

Thus, the selection probability includes current word probability, next word probability, next to next word probability. The probability of C3W4 is measured by the probability that it can occur after one or more words in C2 and also as next to next word prediction of one or more words in C1. A word in the current word cluster C can therefore be a next word prediction of more than one word in the previous cluster.

If the input pattern IP passes through a second candidate word W in the cluster C, then the portion of the input pattern IP that is coincident with and proximal to the corresponding selection node for the second candidate word W is analysed at interim points. By way of example, in FIG. 9 the input pattern IP passes through the first word W1 in the first cluster C1 before passing through the sixth word W6 in the same cluster. The combined weights of one or more parameters can be analysed to determine which one of the candidate words W is to be inserted into the editor. The parameters can comprise one or more of the following:

a. The relative selection probability of each candidate word (for example the relative selection probability of the first candidate word W1 and the sixth candidate word W6);
b. The relative dwell time of the input pattern over the respective selection nodes (for example the relative dwell time on the selection nodes for the first candidate word W1 and the sixth candidate word W6);
c. The relative pressure applied to the touchscreen for the selection nodes for each of the candidate words disposed on the input pattern IP (for example the relative pressure applied to the selection nodes for the first candidate word W1 and the sixth candidate word W6);
d. The order in which the input pattern IP traces over the candidate words (for example, the input pattern IP traces over the first candidate word W1 before tracing over the sixth candidate word W6); and
e. An angle and/or direction change in the input pattern IP at each candidate word and/or as the input pattern traces out from each word (for example the angle formed in the input pattern IP as it enters and exits the selection node for the sixth word W6).

The analysis determines which of the candidate words W is more likely to have been intended by the user and that candidate word W is then inserted inline in the editor. For example, the sixth word W6 could be inserted inline into the editor to replace the first word W1. The insertion of a traced word inline can be done at the point of trace; or at such a decision point later as the input pattern traces through the cluster C; or as the input pattern exits a pre-defined region for that cluster C.

A visual feedback can be provided to ensure the user can correct erroneous selections.

Within each cluster C the candidate words W are arranged such that the candidate words W having similar selection probabilities are spaced apart from each other. For example, the first and second candidate words W1, W2 are disposed on opposite sides of the first cluster C1; whereas the first and sixth candidate words W1, W6 are disposed adjacent to each other within the first cluster C1. For words which are next word predictions (like in n-gram relationships), the probabilities are in relation to the previous words. This can be used for the cluster arrangements when it is not a beginning of sentence or context.

As the input pattern IP is traced out from the first cluster C1 to the second cluster C2, the first candidate word selection is validated and input inline. When entering the next cluster (for example exiting the first cluster C1 and entering the second cluster C2), the input pattern IP can pass through one or more candidate words W before reaching the next intended cluster. To avoid ambiguities, the words in consecutive word clusters C (i.e. the first and second clusters C1, C2; the second and third clusters C2, C3; and so on) are arranged such that, as far as practicable, the selection probabilities of next word predictions are not in close proximity to each other.

The selection probabilities of the candidate words W in the consecutive clusters are compared (for example, C1.W1, C2.W1, C1.W2, C2.W2) and the candidate words W arranged in the consecutive clusters C such that there can be minimal ambiguity when the input pattern transitions to the next cluster, for example from the first cluster C1 to the second cluster C2, for these words.

A first approach is to ensure a similar positioning logic is applied for the ranks of candidate words W in each cluster C. As illustrated in FIG. 9, the candidate words W are displayed within each cluster C based on a ranking corresponding to their selection probabilities. The display position of a candidate word W having a particular ranking (in relation to the other candidate words W for that cluster C) is the same in each cluster C. In the illustrated example, the first candidate word W1 (i.e. the candidate word W having the highest selection probability) is displayed in the 12 o'clock position within each cluster C.

Figure 10:
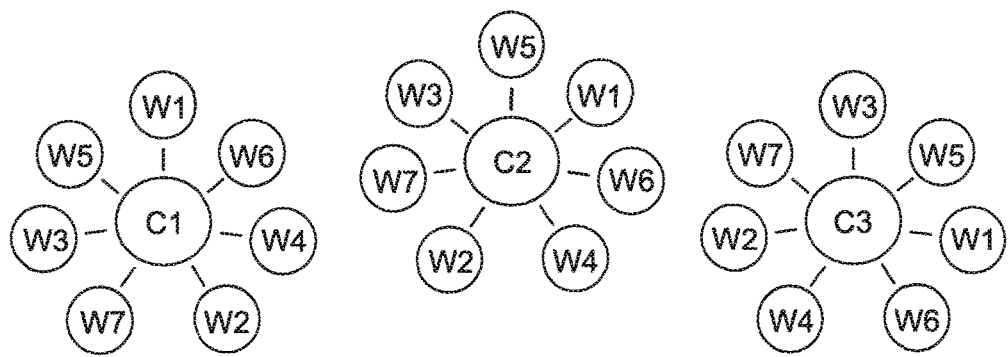
FIGS. 10, 11 and 12 illustrate positioning arrangements of word clusters according to a further aspect of the present invention.

A second approach is to offset the display positions of the candidate words W in consecutive clusters C. For example, the display position of a candidate word W having a particular ranking (in relation to the other candidate words W for that cluster C) can be adjusted by a pre-defined number of positions in each consecutive cluster C. With reference to FIG. 10, the display position for the candidate words W is advanced by one position in each consecutive cluster C. Thus, in the illustrated example, the first candidate word W1 in the first cluster C1 is displayed in the 12 o'clock position; the first candidate word W1 in the second cluster C2 is displayed in the 1 o'clock position; and the first candidate word W1 in the third cluster C3 is displayed in the 3 o'clock position.

With a view to further reducing ambiguities, the word clusters C can be spaced apart sufficiently from each other. Alternatively, the word clusters C can be displaced vertically and/or horizontally from each other to reduce ambiguity between clusters. The positioning described here can include the corresponding screen position and offsets based on the length of the word, font size etc which corresponds to the word region when displayed.

Figure 11:
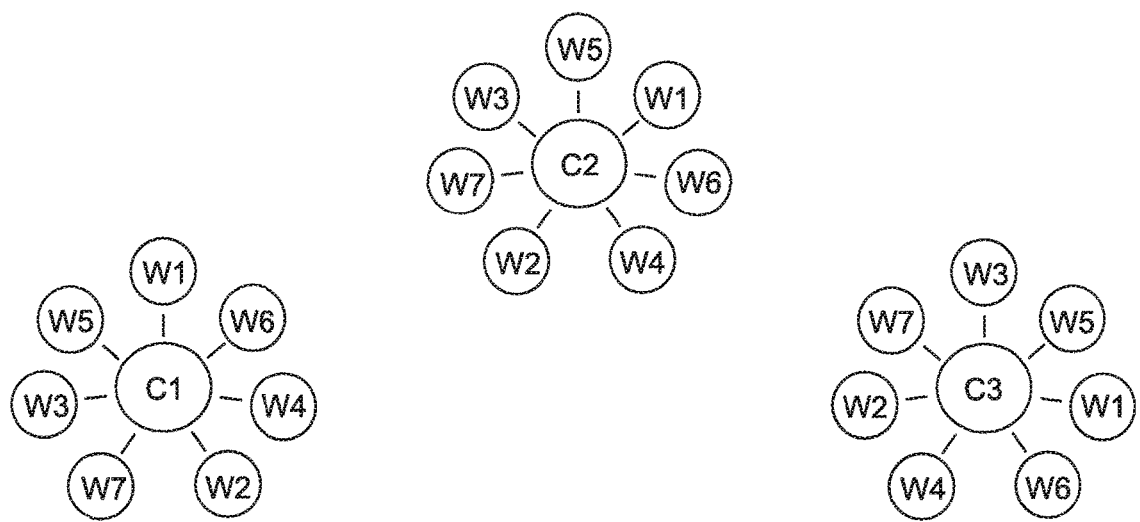

A further technique is to display the word clusters C in a wave form (for example, a sine wave), as illustrated in FIG. 11. The display of the word clusters C in a wave form can help to make the traversal of the word clusters C smoother and natural for a user. This waveform display technique can also help in generating a minimum significant angle when straight lines are drawn between most candidate words W in one cluster C to the significantly higher probability candidate words W in the next cluster C.

Once the input pattern IP enters the second cluster C2, a similar technique is employed to identify a candidate word W to be selected. For example, the input pattern IP must be in a word region defined within the second cluster C2. A significant amount of the input pattern should fall within this word region, for example determined with reference to a predefined threshold. A further requirement can optionally be to identify a significant amount of dwell time and/or pressure parameter etc., for example determined with reference to a threshold.

At every interim distance on the input pattern, a change in angle/direction is measured and a weighting assigned. The point at which the angular change is a maximum point can then be identified as a corner point on the input pattern IP as it is traced dynamically. The input pattern IP being traced by the user is treated as a digital curve. The identified corner points optionally in combination with one or more additional parameters (such as dwell time and/or pressure parameters) can be used to determine the Significant Interim Point (SIP). The candidate word W having a selection node coincident with (or closest to the SIP) is then identified and the probability retrieved. The combined weight of SIP and probability is then considered and a decision is taken against any other SIPs traced by the user within that cluster before exiting the same. The combined weighting and probability is used to select the candidate word W for input inline into the editor.

Figure 12:
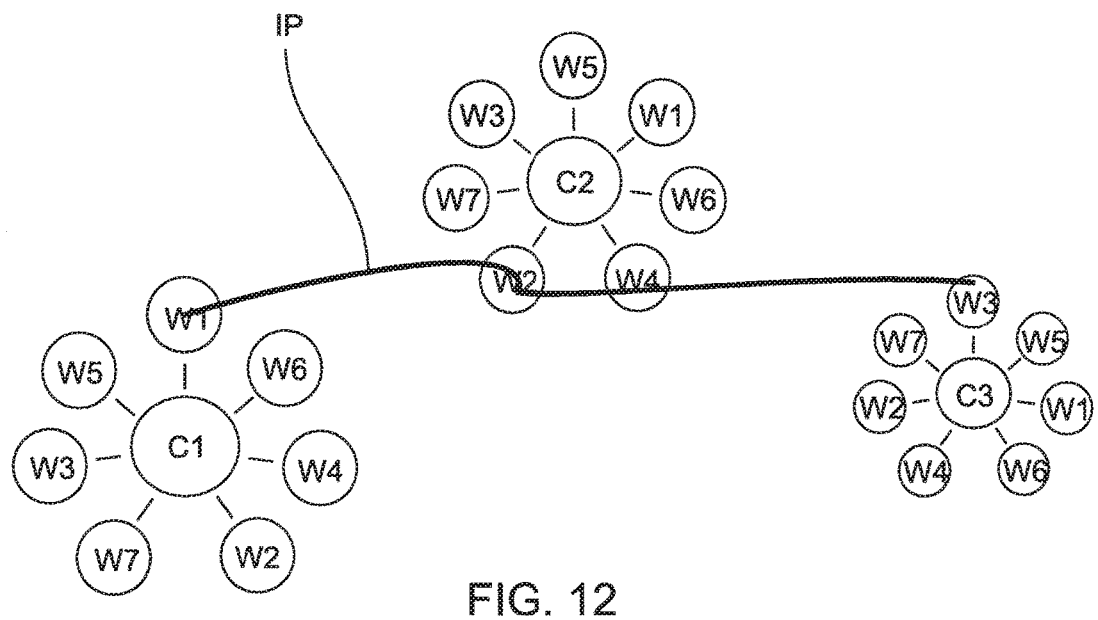

The cluster sizes can be reduced in the order of their position in the sentence to give a hierarchy to the trace. With reference to FIG. 12, the display can be configured such that the first cluster C1 is larger than the second cluster C2 which, in turn, is larger than the third cluster C3.

The Significant End Point (SEP) of the input pattern IP is identified based on one or more of the following:
  a. The point of release of the finger after the input pattern IP has been initiated, corresponding to a final contact point FCP;
  b. If the release happened within a word cluster C, then
    i. The best fitting SIP as mentioned above is identified; or
    ii. If no best fitting SIP is present, then the point of release is analysed based on the candidate word W on which the region of the input pattern IP falls at the FCP. If the probability of occurrence (context, unifrequency etc.) is sufficiently high compared to previous candidate words W (and/or punctuations) then it is accepted as an SEP; or
    iii. If no word region can be mapped to the FCP then do nothing.
  c. The word W that maps most closely to the SEP is inserted into the editor.

Spaces or punctuations can automatically be inserted when the SSP/SIP/SEP is inserted inline. Alternatively, spaces or punctuation can be inserted automatically when the next input event is triggered.

Within this type of a word cluster C, irrespective of the number of times the input pattern IP traces through the candidate words W in that word cluster C, the candidate word W corresponding to the last identified SIP replaces the already inserted word inline. Only one word/phrase (selection node) can be selected in a cluster at any time. If the input pattern IP exits a word cluster C and re-enters the word cluster C without a refresh gesture/event then this holds true. When the user exits a word cluster C the caret (A) will be at the end of the text in the editor so that the user can continue the input pattern IP seamlessly.

The font size of the candidate words W can be arranged in order of the selection probabilities to help reduce ambiguous paths.

Although the present embodiment has been described with reference to seven candidate words (W1, W2, W3 . . . W7) in each word cluster C, it will be understood that less than or more than seven candidate words W can be displayed. It is envisaged that a plurality of candidate words W will be displayed in each word cluster C, but it is conceivable that single candidate words W for selection by the user could be displayed between consecutive word clusters W. Moreover, it will be understood that less than or more than three word clusters C can be displayed. It is envisaged that the technique will comprise displaying a plurality of said word clusters C simultaneously, but the techniques described herein could equally be employed for a single word cluster C.

The description details the approach where the positioning between clusters and within clusters are such that significant points (SSP, SIPs, SEP) can be identified as the input pattern IP is traced. The word clusters can be displayed to define significant corner points CP which can be weighted based on a measured included angle, for example. One way to increase angular change within the input pattern IP is through the word cluster ranked position offset technique described above. A further technique to induce angular change IP in the trace pattern is by offsetting the word clusters C vertically and horizontally relative to each other. For example, the word clusters C can be displayed on the touchscreen such that a virtual centre point of a first word cluster C1 is offset vertically and horizontally from the virtual centre point of the second word cluster C2 and so on throughout the sequence.

Figure 13:
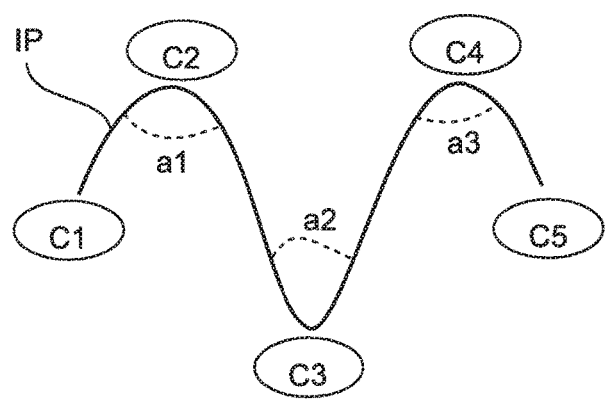
FIG. 13 illustrates the identification of significant points within an input pattern traced through a series of word clusters.

A still further technique is to ensure that straight lines drawn from the centre of a selection node in one word cluster C to the centres of selection nodes in the next word cluster C provide a measurable (and significant) angle change a. For example, arranging the word clusters C along a Sine wave can ensure there is a significant angular change between the input pattern IP drawn between candidate words W displayed in consecutive word clusters C. As shown in FIG. 13, the angle α will be measured at the point where there is a change in slope; a maximum point in the curve is reached; and/or a direction change occurs. A weight will be applied based on the measured angle and the point will be identified as a corner point CP within the input pattern IP.

Figure 14:
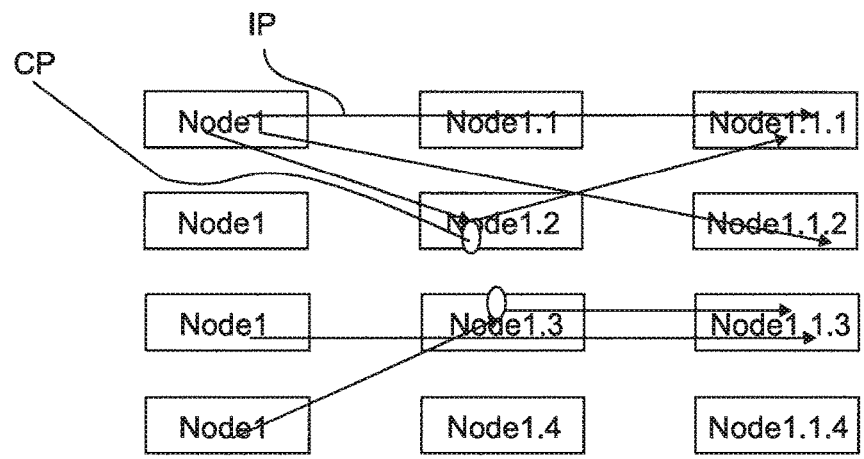
FIG. 14 illustrate an alternative candidate word placement technique according to a further aspect of the present invention.

An alternate arrangement is to display the candidate words W having the highest selection probability in a linear arrangement across a series of word clusters C. Thus, the candidate words W having the highest selection probability in a sequence of word clusters C can be selected by tracing a linear input pattern IP, as illustrated in FIG. 14. This can lead to highest probability patterns being a straight line but for other lesser probability patterns having significant inflections and or straight lines. In this scenario, the input pattern IP is analysed to determine corner points CP which are used to identify the corresponding selection node to input the appropriate candidate words W. The other parameters and techniques described herein can be used to supplement or replace the identified corner points CP.

Figure 15:
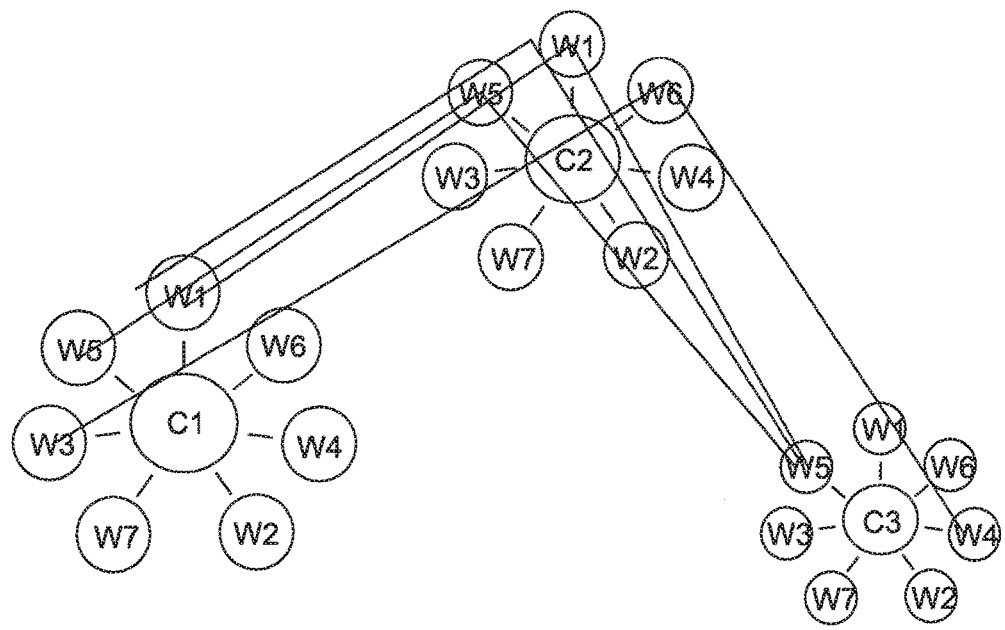
FIG. 15 illustrates a series of input patterns traced through a sequence of word clusters arranged in accordance with a further aspect of the present invention.

With reference to FIG. 15, a series of traced input pattern IP are illustrated for selecting candidate words (W1-W7) from a sequence of three word clusters (C1, C3, C2). By way of example, three input patterns IP are illustrated starting proximal to, or coincident with the selection nodes 4 and the first and fifth candidate words W1, W5 in the first word cluster C1. The relative weighting of the first and fifth candidate words W1, W5 in the first word cluster C1 are compared to resolve the ambiguity arising from the start point of the illustrated set of three input patterns IP. The length of the traced input pattern IP falling within the respective selection nodes for the first and fifth words W1, W5 in the third word cluster C3 are then compared to determine which candidate word W is to be selected from the third word cluster C3. The input patterns IP each terminate in the fifth word W5 in the second word cluster C2 and this candidate words W can be selected without further analysis.

An alternate input pattern IP is illustrated in FIG. 15 starting from the third candidate word W3 in the first cluster C1. The input pattern IP crosses the sixth candidate word W6 in the first cluster C1 and a comparison is made between the length of the input pattern IP falling within the selection nodes for the respective third and sixth candidate words W3, W6. A weighting is also applied based on the relative selection probabilities of the third and sixth candidate words W3, W6. The input pattern IP starts at the selection node corresponding to the third candidate word W3 in the first cluster C1 and this is identified as a significant start point (SSP). The proximity of the SSP is also factored into the analysis to determine whether the third candidate words W3 or the sixth candidate words W6 is to be input inline to the editor. In the second word cluster C2, the relative length of the input pattern IP over the third and sixth candidate words W3, W6 is again compared, along with the location of a significant intermediate point (SIP) identified as a corner point CP over the sixth candidate words W6. In the third word cluster C3, the length of the input pattern IP traced within the selection nodes for the first and forced candidate words W1, W4 is compared, along with the relative selection probabilities for each candidate word W. The input pattern IP terminates when the user lifts off from the touchscreen and this is identified as a significant endpoint (SEP). The location of the SEP relative to the selection nodes for the first and fourth candidate words W1, W4 is also taken into account when determining which candidate word W is to be input.

Figure 16:
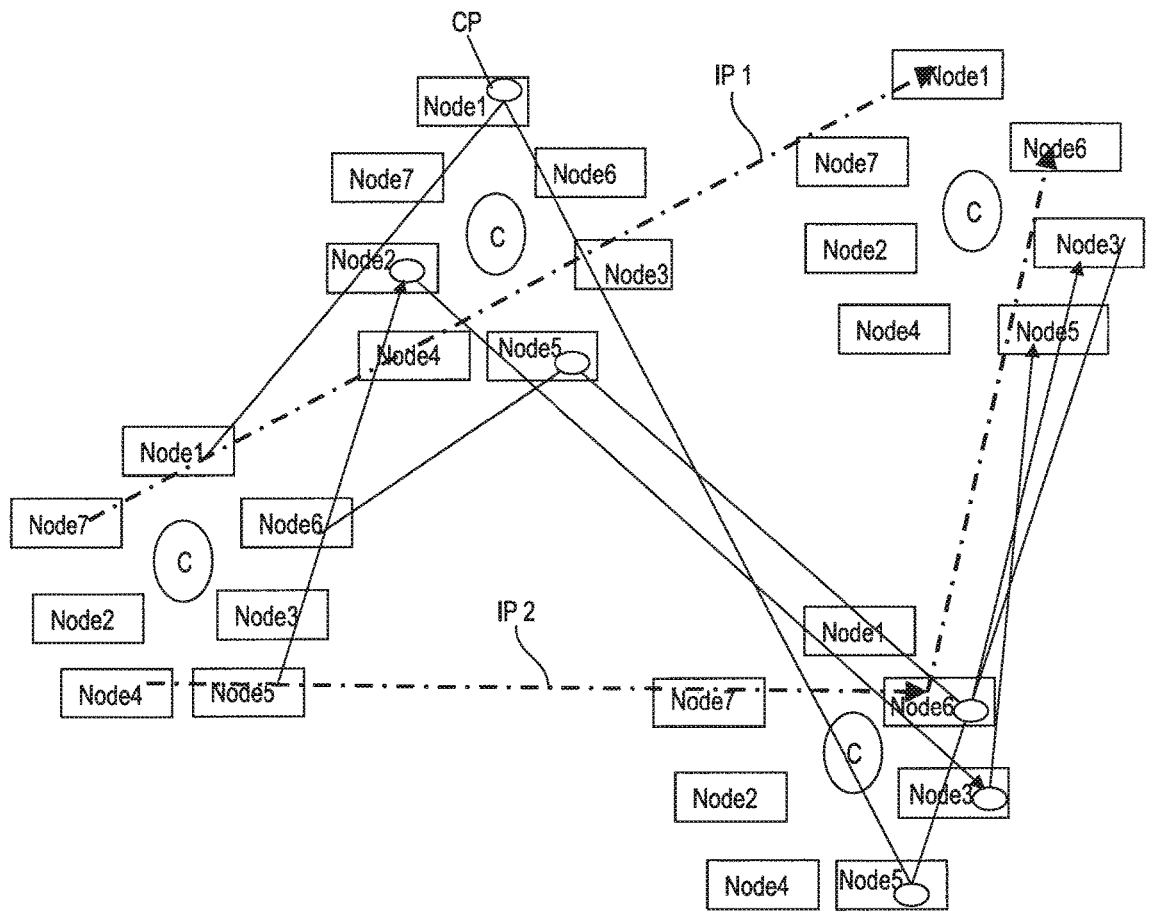
FIG. 16 illustrates a series of input patterns traced through a sequence of word clusters arranged in accordance with a further aspect of the present invention.

A further set of input patterns IP are illustrated in the exemplary display illustrated in FIG. 16. The identification of a series of corner points CP are illustrated for three input patterns IP traced in sequence through the four word clusters (C1-C4). A first input pattern IP1, traced directly from the first word cluster C1 to the fourth word cluster C4, is illustrated in FIG. 16. The first input pattern IP1 does not follow the sequence of the word clusters (C1-C4). One approach would be to ignore the first input pattern IP1. Alternatively, the significant start point SSP; the significant intermediate point(s) SIP (if present); and the significant endpoint SEP can be identified and analysis performed based on these points. Again, the selection probability can comprise identifying the occurrence of one or more of the following: a particular next word, a trace length (i.e. the length of the input pattern extending over the selection node), a contact pressure, a dwell time etc.

A second input pattern IP2, traced from the first word cluster C1 to the third word cluster C3 and then to the fourth word cluster C4, is also illustrated in FIG. 16. Again, analysis of the second input pattern IP 2 can be performed based on the SSP, SEP and any SIPs. Alternatively, or in addition, the analysis can consider one or more of the following: dwell time, trace length, contact pressure, selection probability of the specific words and any corner points. The corner points CP can be analysed based on their position in relation to the selection nodes, and optionally also their relative weights based on the measured included angle α.

Figure 17:
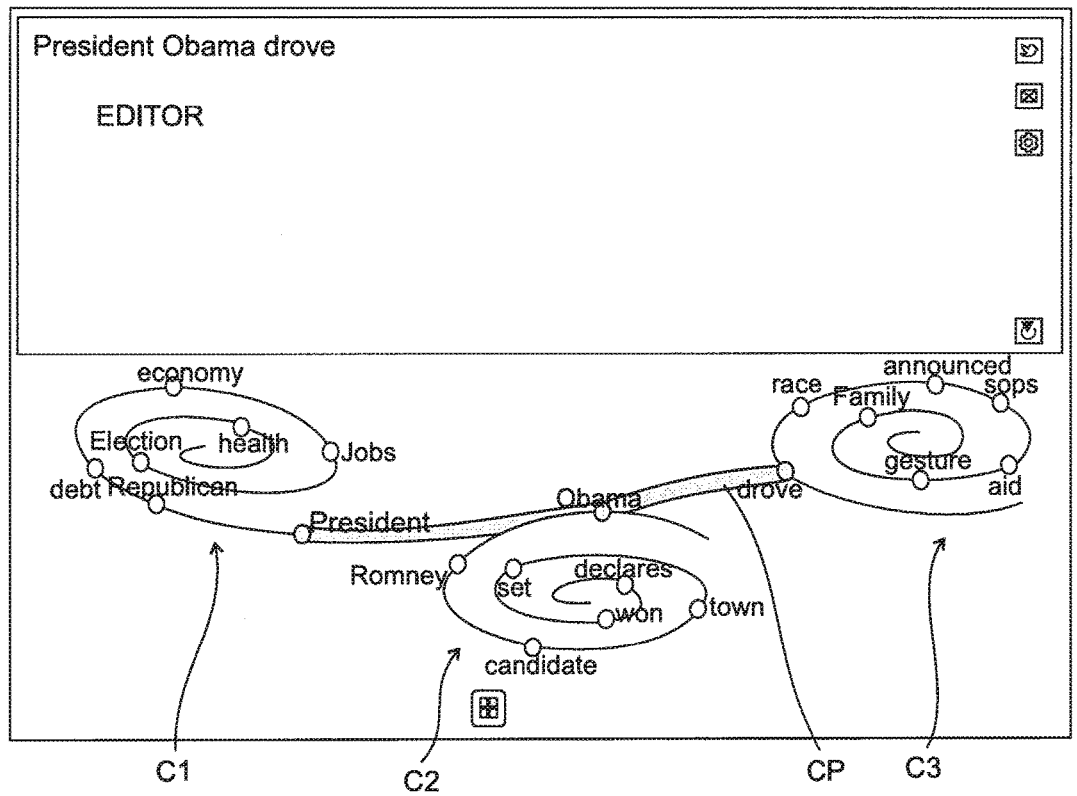
FIG. 17 illustrates a graphical user interface implementing the word cluster arrangement techniques described herein.

The word clusters C illustrated in FIGS. 9 to 16 comprise a clock face arrangement with the candidate words W evenly spaced around the circumference of the word cluster C. It will be appreciated, however, that the particular display configuration can be modified. By way of example, an illustration of the user interface is illustrated in FIG. 17. The candidate words W are displayed in perspective extending outwardly from a centre point along a spiral pathway. The distance from the centre point to each candidate word W is directly proportional to the probability of that candidate word W being selected. Thus, the candidate words W which is least likely to be selected is displayed closest to the centre point. Conversely, the candidate words W which is considered to be most likely to be selected is displayed at the outside of the spiral. In the arrangement illustrated in FIG. 17, the font size is also varied in dependence on the probability of each word being selected. Thus, the words having a higher probability are displayed in a larger font size.

The word cluster W can be rotated about the centre point to adjust the display position of all of the candidate words W within the word cluster W without affecting their relative positions. This rotation technique has particular application in arrangements in which more than one word cluster W is displayed. For example, a first word cluster C1 and/or a second word cluster C2 can be rotated to reduce the path distances between certain candidate words W in the respective first and second word clusters C1, C2. This technique can be employed to position one or more pairs of candidate words W closer together. Thus, the length of the input pattern IP traced by the user to select that word pair can be reduced. The one or more pairs of candidate words W can be identified with reference to combined probability data.

The rotation technique can be applied to modify the input pattern IP which must be traced by the user to select one or more candidate words W. For example, the first word cluster C1 and/or the second word cluster C2 can be rotated to induce a corner point or change in direction at a selection node associated with a particular candidate word (or words) W. For example, it may be desirable to induce a corner point or change in direction proximal to a selection node for a candidate word W having a relatively low probability of selection. By inducing a relatively strong corner point or change in direction, that candidate word W can be identified with a higher degree of certainty. In certain circumstances, it may be appropriate to induce a corner point or change in direction proximal to a selection node for a candidate word W having a relatively high probability of selection. These techniques can also be implemented to determine the relative positioning of the candidate words W within a word cluster C.

The rotation technique can also be employed to reduce or avoid ambiguities in the input pattern IP. The rotation technique can be applied to the complete word cluster C (i.e. preserving the relative positions of the candidate words W); and/or rotating one or more of the candidate words W with in the word cluster C. For example, the first word cluster C1 and/or the second word cluster C2 can be rotated to arrange the candidate words W such that a linear path can be traced between one or more pairs of candidate words W without traversing other candidate words (or at least to minimise any such crossovers in said input pattern IP). Again, the one or more pairs of candidate words W can be identified with reference to combined probability data.

The relative positioning of the candidate words W within each word cluster C can be fixed when the candidate words W are identified for display. Alternatively, the relative positioning of the candidate words W can be modified dynamically. For example, the relative positioning of the candidate words W in the second word cluster C2 and/or the third word cluster C3 can be varied as the input pattern IP is traced through the first word cluster C1. Similarly, the relative positioning and/or orientation of the word clusters C can remain fixed; or can be modified dynamically.

The present invention has been described with particular reference to a cellular telephone. However, it will be appreciated that the word prediction system 120 can be embodied in a range of applications which permit gesture input, for example gaming, projections, stylus, finger, wand remote, etc.

It will be appreciated that various changes and modifications can be made without departing from the spirit and scope of the present invention. For example, the appearance of one or more word clusters can be changed dynamically as the input pattern is traced. Equally, the appearance of the keyboard can be changed dynamically, for example initially to display the keyboard in a small size which is enlarged as the input pattern is traced towards the keyboard. The appearance of a symbol pad can be altered dynamically, for example when there is a context break, such as a comma, full stop (period), etc., in the input text. The system described herein can be configured to display a symbols keyboard around a detected contact event. The symbols keyboard can be displayed continuously or can be called, for example by tracing a predefined gesture dynamically as the input pattern is traced.

The invention claimed is:

1. A computer-implemented method for inputting text into an electronic device, the method comprising:
   selecting a first set of candidate words from a database;
   identifying a second set of candidate words in the database after selecting said first set of candidate words;
   simultaneously displaying, with a display screen, a first word cluster and a second word cluster in advance of an input to select a plurality of candidate words from said first word cluster and said second word cluster, wherein said first word cluster comprises a plurality of words from said first set and said second word cluster comprises plurality of words from said second set;
   while simultaneous displaying said first word cluster and said second word cluster, detecting a continuous trace across said display screen and through said first word cluster and said second word cluster, said continuous trace generated by a user and identifying said plurality of selected candidate words disposed along or proximal to said continuous trace, wherein one of said plurality of selected candidate words is from said first word cluster and another of said plurality of selected candidate words is from said second word cluster; and
   in response to detecting said continuous trace, displaying said plurality of selected candidate words in a text entry field of said display screen,
   wherein said candidate words in said first set are arranged within said first word cluster in dependence on a first statistical indicator of a likelihood of each candidate word of said first set being selected by said user; and said candidate words in said second set are arranged within said second word cluster in dependence on a second statistical indicator of a likelihood of each candidate word of said second set being selected by said user,
   wherein said first statistical indicator comprises a selection probability, said selection probability being a combined probability to provide an indication of a likelihood of two or more words being selected to form a sequence, wherein said method further comprises:
   identifying one or more pairs of candidate words in said first and second sets having a relatively high combined selection probability, and displaying said one or more pairs of candidate words proximal to each other in said first and second word clusters, and
   wherein, within each of said first word cluster and said second word cluster, said candidate words are arranged such that the candidate words having similar selection probabilities are spaced apart from each other.

2. A computer-implemented method as claimed in claim 1 comprising selectively panning and/or zooming between and/or within said one or more of said clusters to facilitate selection of a candidate word.

3. A computer-implemented method as claimed in claim 2 wherein said panning and/or zooming is dependent on one or more of the following: an applied pressure on a touchscreen; a dwell time; a selection interval; detection of a predefined gesture; detection of a movement by a motion sensor.

4. A computer-implemented method as claimed in claim 1, wherein the one or more identified candidate words are input sequentially or collectively into the text entry field.

5. A computer-implemented method as claimed in claim 1 comprising displaying one or more of the following clusters: a symbol cluster; a numerical cluster; an alphanumeric cluster; an emoticon cluster; a character cluster; and a word cluster.

6. A computer-implemented method as claimed in claim 5 wherein said one or more clusters are predicted and displayed proximal to the input pattern.

7. A computer-implemented method as claimed in claim 1 wherein the one or more identified candidate words are displayed in a lattice structure comprising one or more selection nodes corresponding to each candidate word.

8. A computer-implemented method as claimed in claim 7 wherein the displayed candidate words are refreshed when the input pattern enters one of said selection nodes to select the candidate word associated with that selection node.

9. A computer-implemented method as claimed in claim 7 wherein the displayed candidate words are refreshed when the input pattern is traced from a current root node to a child node and the distance travelled by the input pattern between the current node and the 15 child node is greater than a pre-defined distance threshold.

10. A computing device programmed to perform the method as claimed in claim 1.

11. A computer-implemented method as claimed in claim 1, wherein, upon identification of a candidate word in said first word cluster, at least some of the candidate words displayed in the second word cluster is updated or refreshed.

12. A computer-implemented method as claimed in claim 11, wherein the changes to the second word cluster comprise: changing word endings; or replacing some or all of the candidate words for selection.

13. A computer-implemented method as claimed in claim 1, wherein the candidate words displayed in each word cluster are updated in real time as the continuous input pattern is traced by the user.

14. A computer-implemented method as claimed in claim 13, wherein, if the continuous input pattern is currently associated with the first word cluster, the candidate words in one or more of the other word clusters are refreshed.

15. A computer-implemented method as claimed in claim 1, comprising displaying a third word cluster simultaneously with said first and second word clusters.

16. A computer-implemented method as claimed in claim 15 wherein the third word cluster is vertically and horizontally offset from the second word cluster.

17. A computer-implemented method as claimed in claim 1 wherein, in the event that a desired candidate word is not displayed, the displayed candidate words are refreshed to display new candidate words for selection by the user when said continuous input pattern corresponds to a predefined refresh gesture or said continuous input pattern enters/exits a predefined region.

18. A computer-implemented method as claimed in claim 17 wherein refreshing the displayed candidate words comprises: displaying additional words from said first set of candidate words and/or selecting a second set of candidate words from the database and displaying at least some of said second set of candidate words.

19. A computer-implemented method as claimed in claim 17 wherein the refresh gesture comprises a loop or a circular formed in the input pattern.

20. A computer-implemented method as claimed in claim 19 wherein said loop is traced in a first direction to transition from right-to-left to left-to-right input; and said loop is traced in a second direction to transition from left-to-right to right-to-left input; wherein said first and second directions are opposite to each other.

21. A computer-implemented method as claimed in claim 17 wherein the method comprises determining a major input direction of the input pattern; and the refresh gesture comprises an angular change in said major input direction greater than or equal to an angular threshold.

22. A computer-implemented method as claimed in claim 17, wherein said predefined refresh gesture comprises detecting a multi-touch event and/or two or more consecutive contact points.

23. A computer-implemented method as claimed in claim 22, wherein the refreshed candidate words are displayed in the same direction as the input pattern if a second touch event falls in the region of the touchscreen where the input pattern has not yet been traced; and the refreshed words are displayed in the opposite direction to the input pattern if the second touch event falls in the region of the touchscreen where the input pattern has been traced.

24. A computer-implemented method as claimed in claim 17, wherein said predefined region comprises an edge of an input area; an edge of a predefined window; or a refresh node.

25. A computer-implemented method as claimed in claim 1, wherein the first and second word clusters are vertically and horizontally offset from each other.

26. A computing device comprising:
an input interface;
a display;
a processor, when operating a set of computer-readable instructions to perform a word prediction process, is configured to:
select a first set of candidate words from a database;
identify a second set of candidate words in the database after selecting said first set of candidate words;
simultaneously display, via said display, a first word cluster and a second word cluster in advance of an input to select a plurality of candidate words from said first word cluster and said second word cluster, wherein said first word cluster comprises a plurality of words from said first set and said second word cluster comprises plurality of words from said second set;
during simultaneous display of said first word cluster and said second word cluster, detect a continuous trace across said display and through said first word cluster and said second word cluster, said continuous trace generated by a user, and identifying identify said plurality of selected candidate words disposed along or proximal to said continuous trace, wherein one of said plurality of selected candidate words is from said first word cluster and another of said plurality of selected candidate words is from said second word cluster; and
in response to detection of said continuous trace, display said plurality of selected candidate words in a text entry field of said display, wherein said candidate words in said first set are arranged within said first word cluster in dependence on a first statistical indicator of a likelihood of each candidate word of said first set being selected by said user; and said candidate words in said second set are arranged within said second word cluster in dependence on a second statistical indicator of a likelihood of each candidate word of said second set being selected by said user,
    wherein said first statistical indicator comprises a selection probability, said selection probability being a combined probability to provide an indication of a likelihood of two or more words being selected to form a sequence, wherein said processor is further configured to:
    identify one or more pairs of candidate words in said first and second sets having a relatively high combined selection probability; and
    display said one or more pairs of candidate words proximal to each other in said first and second word clusters,
    wherein, within each of said first word cluster and said second word cluster, said candidate words are arranged such that the candidate words having similar selection probabilities are spaced apart from each other.

* * * * *